(12) United States Patent
Chen et al.

(10) Patent No.: US 9,326,110 B2
(45) Date of Patent: *Apr. 26, 2016

(54) PREPAID CHARGING INTERFACE ENHANCEMENTS ENABLING PREPAID MESSAGING BUCKETS

(71) Applicant: CELLCO PARTNERSHIP, Basking Ridge, NJ (US)

(72) Inventors: Ben-Ren Chen, Northboro, MA (US); Robert Martin Ephraim, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/184,247

(22) Filed: Feb. 19, 2014

(65) Prior Publication Data

US 2014/0171019 A1    Jun. 19, 2014

Related U.S. Application Data

(63) Continuation of application No. 11/408,939, filed on Apr. 24, 2006, now Pat. No. 8,670,745.

(51) Int. Cl.
| | |
|---|---|
| *H04W 4/12* | (2009.01) |
| *H04M 15/00* | (2006.01) |
| *H04M 17/02* | (2006.01) |
| *H04M 17/00* | (2006.01) |

(52) U.S. Cl.
CPC ............... *H04W 4/12* (2013.01); *H04M 15/41* (2013.01); *H04M 15/51* (2013.01); *H04M 15/80* (2013.01); *H04M 15/85* (2013.01); *H04M 15/854* (2013.01); *H04M 17/02* (2013.01); *H04M 17/10* (2013.01); *H04M 15/888* (2013.01); *H04M 2215/0192* (2013.01); *H04M 2215/28* (2013.01)

(58) Field of Classification Search
CPC ....... H04W 4/12; H04M 15/85; H04M 15/41; H04M 15/80; H04M 15/51; H04M 15/854; H04M 17/02; H04M 17/10; H04M 2215/0192; H04M 15/888; H04M 2215/28

See application file for complete search history.

(56) References Cited

U.S. PATENT DOCUMENTS

| | | | |
|---|---|---|---|
| 6,266,614 B1 | 7/2001 | Alumbaugh | |
| 6,496,690 B1 | 12/2002 | Cobo et al. | |

(Continued)

OTHER PUBLICATIONS

Entire Prosecution History of U.S. Appl. No. 11/408,939, filed Apr. 24, 2006, entitled Prepaid Charging Interface Enhancements Enabling Prepaid Messaging Buckets.

*Primary Examiner* — Brandon Miller

(57) ABSTRACT

The signaling interface between a wireless network message center and a prepaid control platform is enhanced by the addition of one or more parameters useful in supporting special accounting treatments for user message communications through a wireless network, for example, include a ConnectedAddressList, an ExceptionIndicator and/or a PolicyOverrideIndicator. The ConnectedAddressList and PolicyOverrideIndicator can be used to allow a prepaid wireless service provider to offer a wide variety of free or specially priced messaging buckets to its subscribers (or to a select group of its subscribers). User messages may be delivered for free, for example, if they are going to or coming from other customers of the service provider. The ExceptionIndicator can be used to block application of such buckets, e.g. to enable premium pricing, for international delivery or the like.

19 Claims, 12 Drawing Sheets

(56) References Cited

U.S. PATENT DOCUMENTS

| | | |
|---|---|---|
| 7,092,697 B1 * | 8/2006 | Kupsh et al. ............... 455/406 |
| 7,120,418 B2 | 10/2006 | Herajarvi et al. |
| 7,171,190 B2 | 1/2007 | Ye et al. |
| 7,366,136 B1 | 4/2008 | Kalbag et al. |
| 7,428,510 B2 | 9/2008 | Titus et al. |
| 8,670,745 B1 * | 3/2014 | Chen et al. ............... 455/406 |
| 2001/0039191 A1 | 11/2001 | Maierhofer |
| 2002/0029189 A1 | 3/2002 | Titus et al. |
| 2002/0103762 A1 | 8/2002 | Lopez et al. |
| 2003/0091170 A1 * | 5/2003 | McCann et al. ........... 379/114.2 |
| 2003/0216147 A1 | 11/2003 | Morin et al. |
| 2004/0077332 A1 | 4/2004 | Ephraim et al. |
| 2004/0176067 A1 | 9/2004 | Lakhani et al. |
| 2007/0043676 A1 | 2/2007 | Gao et al. |

* cited by examiner

PREPAID CHARGING INTERFACE ENHANCEMENTS ENABLING PREPAID MESSAGING BUCKETS

RELATED APPLICATION

This application is a continuation and claims the benefit of U.S. application Ser. No. 11/408,939 filed Apr. 24, 2006, the disclosure of which is entirely incorporated herein by reference.

FIELD

The present subject matter relates to techniques, network equipment and software to enhance prepaid mobile wireless messaging services, such as short message service (SMS) or multimedia messaging service (MMS), offered on a prepaid basis via a public communication network.

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless networks. Today wireless carriers also offer packet data communication services to their mobile customers. The deployment of broadband packet-based wireless networks allows the carriers and other service providers to offer a variety of new services via Multimedia Messaging Service (MMS) technologies, which enable users of mobile devices to send and receive multimedia content, such as text, graphics, digital photographs, audio files and video clips, via non-real-time transmission.

Prepaid communications services, in which a customer or subscriber prepays for usage of a communications system, have become increasingly popular. Such services now encompass an array of mobile wireless communications. In an example of a prepaid wireless service, the customer may purchase blocks of time for making voice telephone calls via a cellular telephone network. Upon connecting to the wireless communications network, the customer account is authorized and authenticated, and the network allows a call to proceed. The network monitors the customer's usage time and decrements from the customer's account. If the account becomes depleted, the system can either prompt the customer to purchase more time, or the system can terminate the call. The network blocks further calls on the account, until or unless the customer prepays additional funds into the account (replenishes the account) to buy more air time. Prepaid wireless communications system enable the customer to budget an amount of airtime that will be used during a certain period of time, and to insure that the budget will not be exceeded unless the customer purchases more airtime. The wireless service provider likes this type of service, because the carrier receives payment in advance and need not run the risk that the customer will default on a bill, as sometimes happens with post-pay type billing services.

Service providers have extended their prepaid offerings to encompass various wireless data services, including SMS and MMS type messaging services. A messaging service (e.g., Short Message Service or Multimedia Message Service) uses one or more "message centers" that are responsible for receiving and forwarding messages addressed to its subscribers to the addressed subscribers' stations, and responsible for receiving and forwarding messages originated by its subscribers to equipment of the addressed recipients of those messages. The support of real-time prepaid charging for message services may be accomplished through a combination of message center policy and signaling interfaces (to be referred to as the prepaid accounting interfaces) between the message centers and the prepaid servers. These signaling interfaces support a BalanceCheck transaction, which allows a message center to check the remaining balance in a prepaid subscriber's account. The signaling interfaces also support a DebitAccount transaction that allows a message center to request the prepaid server to apply a charge against the subscriber's account for a message the subscriber has sent or received.

Typically, these transactions identify the prepaid subscriber that has sent or will receive a message, but they do not identify the other participant (destination or source). A message center policy controls the interaction between the message center's use of the prepaid accounting interfaces and the message center's processing of messages sent by or addressed to a prepaid subscriber. The policy reflects a service provider's decision regarding the tradeoff between the service provider's desire to offer high performance (low latency) messaging services and to avoid revenue loss that would occur if messages were accepted from or delivered to subscriber's whose prepaid account is depleted.

For example, assume that the service provider places a greater emphasis on the avoidance of revenue loss. The message center policy may dictate that a subscriber-initiated message is not processed until after a DebitAccount has been sent and a response received indicating that the subscriber has been charged. The message center policy may dictate that it perform a BalanceCheck for a prepaid subscriber before processing a message addressed to that subscriber. The message intended for the subscriber would be forwarded to the mobile station of the prepaid subscriber only if the response from the prepaid server indicates an account balance is high enough. Otherwise, the message center might either discard the message or store the inbound message for later delivery (once the subscriber's account had been replenished).

On the other hand, if a service provider places a greater emphasis on performance, the policy may dictate that messages are normally processed before the DebitAccount is sent, with the message center only delaying message processing. In this case, the message center might only perform a BalanceCheck for a prepaid subscriber if the subscriber's account had been marked as "blocked" because response to a previous DebitAccount message for the subscriber had indicated that the subscriber's account balance was too low to pay for a message. In this second case, the policy might dictate that the subscriber's account be "unblocked" and normal processing be resumed once a BalanceCheck indicates that the subscriber's account balance has been replenished so that it is no longer too low to pay for a message. Until then, the policy might dictate that the message center discard subscriber initialed messages, whereas messages addressed to the subscriber would either be discarded or stored for some period to allow for later delivery to the subscriber (once the subscriber's account had been replenished and thus "unblocked").

A range of policies are possible between these extremes, reflecting different carrier preferences regarding the tradeoff between performance and the avoidance of revenue loss. However, since, signaling on the prepaid charging interface does not identify the destinations (respectively, the source) to which a message is being sent (response from which this message is received), a service provider cannot use this signaling to build services offering subscribers limited or unlimited free messaging, for messages sent to select destinations or received from select sources.

Signaling enhancements would be desirable to allow a service provider to offer a variety of free messaging options to its subscribers (or to a select group of its subscribers). Examples of desirable free service options include (but are by no means be limited to) free messaging for messages sent to or received from the service provider's other subscribers, messages sent to or received from destinations or sources from the subscriber's own country (or state or city/county) and/or messages sent to or received from destinations or sources on a list provided by the subscriber (e.g., a list of select friends, family members, or close business associates).

For some applications, it may also be desirable to allow message centers to recognize when the prepaid server has determined that a message should be treated as free. This would allow service providers to optimize message center policy, so that message centers can interact more intelligently with prepaid services that offer various specialized messaging plans.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
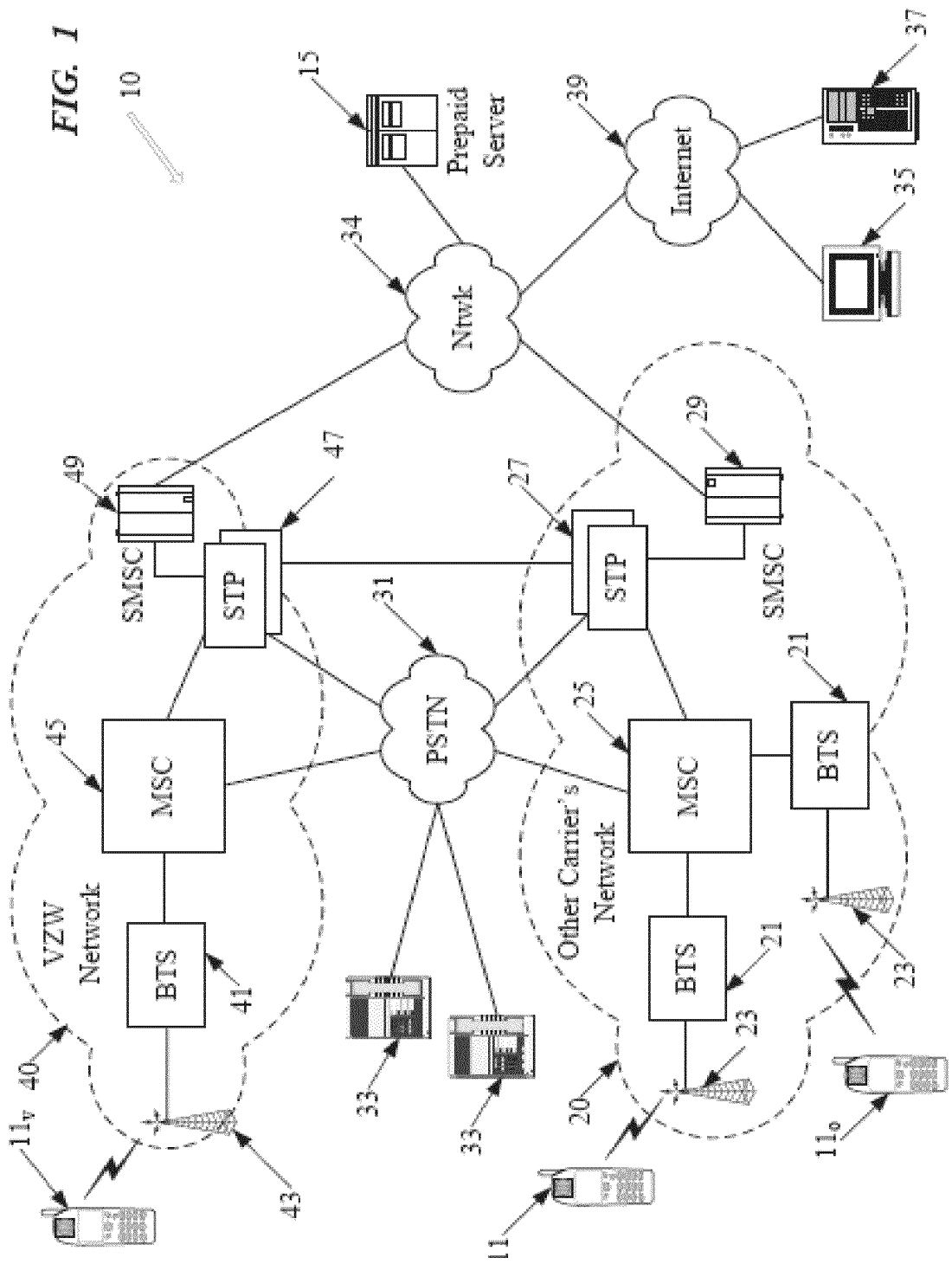
FIG. 1 is a simplified functional block diagram of a system of mobile wireless communication networks offering various services, including an SMS type messaging service, wherein many of the services may be offered on a prepaid basis.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The teachings herein provide enhancements to the signaling with a prepaid control platform, e.g. a prepaid server, to add one or more parameters useful in supporting special accounting treatments for message communications through a wireless network.

For example, the new parameters added to enhance signaling messages related to prepaid treatment of message services such as SMS or MMS, may allow a message service provider to offer a variety of free messaging options to its subscribers or to a select group of its subscribers. Examples include (but are by no means be limited to) free "buckets" of messages, for messages sent to or received from:

The service provider's other subscribers;
Destinations or sources from the subscriber's own country (or state or city); and
Destinations or sources on a list provided by the subscriber (e.g., a list of select friends, family members, or close business associates).

The signaling enhancements also enable providers to intelligently apply other accounting treatments, e.g. premium rates for international service or the like. Enhancements also are disclosed for the responses from the prepaid servers that would allow message centers to recognize when the prepaid server has determined that such a messaging bucket is applicable to a message, allowing message center policy to be enhanced to make use of this information.

Teachings disclosed in the detailed description encompass an improvement in a method of prepaid handling of a user message for communication through a wireless network, e.g. as might be implemented from the perspective of a message service center or the like. The method involves receiving the user message for communication through the wireless network, to or from a mobile station of a subscriber having prepaid wireless service, and sending a request signaling message for a prepaid transaction to a prepaid server. A prepaid transaction response signaling message is received from the prepaid server; and further processing of the user message through the wireless network is controlled based on data contained in the received signaling transaction response message. The improvement is that when the proper inclusion criteria are met the request signaling message includes a connected address list, an exception indicator, or both, and when the proper inclusion criterion is met the response message includes the override indicator. If included, the connected address list comprises an address for each of one or more communications devices other than the mobile station of the prepaid subscriber, from which the user message is received or to which the user message is to be sent. If included, the policy override indicator signifies whether to complete communication of the user message through the wireless network regardless of an otherwise applicable accounting policy.

Teachings disclosed in the detailed description also encompass an improvement in a method of prepaid accounting for handling of a user message for communication through a wireless network, as might be implemented from the perspective of a prepaid server. This prepaid signaling method includes receiving a transaction request signaling message, at the prepaid server from a message center of the wireless network. The received signaling message relates to a requested communication of the user message through the wireless network to or from a mobile station of a subscriber having prepaid wireless service. The method also involves executing a prepaid accounting transaction with regard to an account of the subscriber, in response to the received request for the prepaid transaction. A signaling transaction response message is sent from the prepaid server to the message center reporting a result of the executed prepaid accounting transaction with regard to the subscriber's account, e.g. so as to enable appropriate control of further processing of the user message through the wireless network. The improvement in this second method is that when the proper inclusion criteria are met the request signaling message includes a connected address list, an exception indicator, or both, and when the proper inclusion criterion is met the response message includes the override indicator.

Disclosed examples of the transaction request type signaling message include a balance check request message requesting a check of the balance in a prepaid account of the subscriber, and a debit account request message requesting debiting a prepaid account of the subscriber for delivery of the user message. Disclosed examples of the transaction response type signaling message include a balance check response message and a debit account response message. In one network example, the message center comprises a Short Message Service Center (SMSC); whereas in a second network example, the message center comprises a Multimedia Messaging Service Center (MMSC).

As noted above, the enhanced signaling message parameters enable special accounting treatments. For example, if the user message is intended for communication through the wireless network to the mobile station of the subscriber having the prepaid wireless service; the one or more parameters includes the connected address list; and the connected address list contains an address of a message sending device. Conversely, if the user message is intended for communication from the mobile station of the subscriber having the prepaid wireless service; the one or more parameters includes the connected address list; and the connected address list contains an address of one or more intended destination devices. In either case, if an address in the list meets certain conditions, then the prepaid server enables processing of the user message through the network for free or at a reduced price. The server need not deduct from the prepaid account. The policy override indicator can be used in any response message to instruct the message center to deliver the user message regardless of policy, e.g., even if the account is otherwise blocked because the prepaid funds were exhausted.

The message enhancements may also facilitate premium accounting for some message communications. For example, the exception indicator may be used when there is an international delivery, so as to override a free message option and enable a prepaid server to deduct a premium from the subscriber's prepaid account for international delivery of the user message.

These methods may be embodied in a message center or server platform programmed to implement the relevant steps. Those skilled in the art will also recognize that the methodologies may be embodied in a software product, for example, comprising an executable program for causing a programmable device to perform steps of the respective method and a machine readable medium bearing the executable program.

Teachings disclosed in the detailed description also encompass products related to the enhanced signaling messages communicated across the interface. For example, such a product might comprises a machine readable medium; and signaling content data, forming a signaling message related to a prepaid accounting transaction, carried by the machine readable medium, for communication between a message service center of a wireless network and a prepaid accounting platform. The signaling content data includes the connected address list, the policy override indicator or the exception indicator.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

The various networks, network equipment and communication processing techniques disclosed herein relate to signaling enhancements to the signaling messages sent on the prepaid accounting interfaces, for messaging services such as SMS or MMS, provided via a wireless communication network. These enhancements would allow a service provider to offer a wide variety of free or specially priced messaging buckets to its subscribers (or to a select group of its subscribers). The enhancements also enable other user message communications to receive premium treatment. Of course, many user message communications would not rely on the signaling message enhancements and would be handled in a normal manner.

Disclosed enhancements to the signaling request messages and to the signaling response messages sent to or from the prepaid servers allow message centers to recognize when the prepaid server has determined that a messaging bucket (for a special treatment) is applicable to a message, which allows a service provider to optimize message center policy, so that message centers can interact more intelligently with prepaid services that offer such messaging buckets. The description below introduces three specific logical information elements which may be conditionally included in the signaling messages sent between a message center and a prepaid server across a prepaid accounting interface. These new logical information elements are:

1. ConnectedAddressList;
2. ExceptionIndicator; and
3. PolicyOverrideIndicator.

A detailed discussion of these new logical information elements and their application to prepaid accounting for message services provided through a wireless network is provided later. The present teachings may be implemented in a variety of network architectures that offer wireless packet data communication services. To insure a full understanding and appreciation of the present teachings, it may be helpful at this point to first consider an example of one such network architecture.

FIG. 1 is a functional block diagram of a system 10, including mobile wireless communication networks (20, 40 in the example) and other connected networks (31, 34 and 39 in the example), where the wireless networks offer voice telephone services and SMS message services and may utilize the prepaid processing techniques outlined above.

The communication system 10 provides mobile voice telephone communications for numerous mobile stations 11, three of which are shown in the drawing for ease of illustration. The mobile stations 11 represent the general class of mobile stations that operate via public cellular network or the like. The system 10 enables users of the mobile stations 11 to initiate and receive telephone calls to each other as well as through the public switched telephone network (PSTN) 31, for example for communications with landline telephone devices 33. The system 10 also offers SMS type messaging services, as discussed later.

Many of the services offered through the system 10 are offered on a traditional postpay basis. However, some services are offered on a prepaid basis. For example, a subscriber may purchase 1000 minutes of phone call air time and/or some number of message units for SMS services. A carrier, such as VZW, or a third party service provider will operate a server 15, to support offering of various services on a prepaid basis. The prepaid server manages customers' prepaid accounts.

The mobile stations 11 may take many forms. For example, some mobile stations may be enhanced mobile telephone stations with display and user input capabilities to support certain text and image communications, for example, for e-mail and web browsing applications, and SMS service for purposes of this discussion. Today, such enhanced mobile telephones typically take the form of portable handsets, although they may be implemented in other form factors. Other mobile stations may comprise portable digital assistants (PDAs) with built-in wireless communication capabilities and possibly a voice interface. As another alternative, a wireless device such as network interface card or even a mobile telephone having data communication capabilities may be connected to or integrated into a portable computing device, such as a handheld or laptop type computer.

The system 10 may comprise access networks operated by a large number of separate and independent service providers or "carriers." For discussion purposes, the drawing shows two such radio access networks (RANs) 40 and 20, which we will assume are operated by two different carriers (VZW and another carrier), although those skilled in the art will recognize that large carriers operate a number of such networks and that many countries have more than two mobile carriers that offer or soon will offer packet data communication services. Through the carriers' access networks 20 and 40, the overall system 10 offers public mobile communications to customers using mobile stations 11 throughout a wide geographic area.

Physical elements of a radio access network (RAN) 20, operated by one of the other carriers, include a number of base stations represented in the example by the base transceiver systems (BTS) 21, each of which communicates via an antennae system 23 at the site of base station and the air-link with one or more of the mobile stations 11, when the mobile stations are within range. Each base station typically includes a BTS 21 coupled to several antennae mounted on a radio tower within a coverage area often referred to as a "cell." The BTS 21 is the part of the radio network that sends and receives RF signals to/from the mobile stations that the base station currently serves.

A typical current example of the network 20 also includes a number of radio access network switches. The drawing shows one such switch 25. The switches typically are modern versions of mobile switching centers (MSCs) or Mobile Telephone Switching Offices (MTSOs), which support both cellular voice and packet data services. Each MSC switch 25 connects through trunk circuits to a number of the BTS base station transceivers 21, which the respective switch serves and controls. The MSC switches 25 provide voice service switching, for example, for calls between mobile stations 11 via interconnecting trunks and via the PSTN network 31 for calls to and from landline telephones 33.

The BTS 21 at a base station assigns and reassigns channels to the mobile stations 11 that it serves and monitors the signal levels to recommend hand-offs to other base stations. The network 20 typically includes a base station controller (BSC) functionality (not shown) that controls the functions of a number of base stations and helps to manage how calls made by each mobile station are transferred (or "handed-off") from one serving base station to another. Each wireless network equipment vender implements this function differently. Some vendors have a physical entity, which they call a BSC, while other vendors include this functionality as part of their MSC switch 25.

The network 20 also includes one or more signal transfer points (STPs) 27, typically deployed as mated pairs of STPs, coupled to the MSC switching offices 25 of the network and to elements of the PSTN 31 through signaling system no. 7 (SS7) link sets. The STPs 27 also connect through signaling links to similar elements in the VZW network 40. The STPs and the links thereto provide a signaling network 20, for use in managing call traffic through the telecommunications networks, e.g. networks 20, 31 and 40.

In addition to links to switches 25 of the networks and offices of the PSTN 31, the STPs 27 provide signaling links to control nodes, such as Service Control Points (not shown) and to other special service components of the network. Of note for purposes of the present discussion, the STPs 27 provide a signaling communication link to an SMSC 29. Although STPs and SS7 links normally carry only signaling, for SMS services, these elements also carry user message traffic to and from the SMSC 29. The SMSC 29 also connects to an Internet Protocol (IP) network 34, for receiving and possibly sending messages in IP packet format.

Wireless carriers originally developed the short message service (SMS) to transmit text messages for display on the mobile stations 11. The SMSC 29 is a standard messaging computer used in cellular networks today to offer SMS services to cellular customers. The SMS messaging service supports exchange of user messages between mobile stations 11 as well as communications of user messages from or to wireline devices, represented generically by the personal computer 35 and the server 37 in the drawing. The SMSC 29 receives IP packet communications containing user messages, such as e-mail, intended for transmission to mobile stations 11. The messages may arrive from mobile stations 11, or the SMSC 29 may receive user messages for SMS relayed from another SMSC 49 or from other sources (35 or 37 in our example) via the Internet 39 and the IP network 34. The SMSC 29 forwards the user messages intended for mobile stations it serves ("inbound" messages) to the appropriate MSC 25 via the STP 27 and the SS7 signaling link sets. The MSC 25, in turn, transmits each inbound SMS message over a signaling channel of the radio access network to the intended mobile station 11.

Although different radio access networks may utilize different technologies or architectures, for discussion purposes it is assumed that the RAN 40 is generally similar to the RAN 20. Like the network 20, the physical elements of the radio access network (RAN) 40, include a number of base stations represented in the example by the base transceiver system (BTS) 41. Each BTS 41 communicates via an antennae system 43 at the site of base station and the air-link with one or more of the mobile stations, $11_V$, when the mobile stations are within range. The network 40 also includes a number of radio access network switches. The drawing shows one such switch 45. The switches 45 typically are modern versions of mobile switching centers (MSCs) or Mobile Telephone Switching Offices (MTSOs), which support both cellular voice and packet data services, the same as or similar to the MSC switch 25 discussed earlier. The MSC 45 connects through trunk circuits to a number of the BTS base station transceivers 41, which the respective switch serves and controls. The MSC switches 45 provide voice service switching, for example, for calls between mobile stations 11 via interconnecting trunks and calls to and from landline telephones 33 via the PSTN network 31. The MSC switches 45 also provide voice service switching via trunks (not separately shown) to one or more MSCs 25 in the other carrier's wireless network 20 for communications with mobile stations 11 currently operating through the other wireless network 20.

The network 40 also includes one or more signal transfer points (STPs) 47, typically deployed as mated pairs of STPs, coupled to the MSC switching offices 45 of the network and to elements of the PSTN 31 through signaling system no. 7 (SS7) link sets. The STPs 47 also connect through signaling links to the STPs 27 in the other carrier's network 20. The STPs and the links thereto provide a signaling network, for use in managing call traffic through the telecommunications networks, e.g. networks 20, 31 and 40.

In addition to links to switches 45 of the networks and offices of the networks 20 and 31, the STPs 27 provide signaling links to control nodes, such as Service Control Points (not shown) and to other special service components of the network 40. Of note for purposes of the present discussion, the STPs 47 provide a communication link to an SMSC 49. Although STPs and SS7 links normally carry only signaling, for SMS services, these elements also carry user message traffic to and from the SMSC 49. The SMSC 49 also connects to the IP network 34, for receiving and possibly sending user messages in IP packet format. The SMSC 49 is similar to the SMSC 29 discussed earlier and provides similar messaging services to mobile stations 11 of subscribers of carrier VZW.

Different customers subscribe to service through different providers and are assigned to specific radio access networks (RAN's) 20 or 40 as their home networks; and the mobile stations and network elements are provisioned accordingly. Those skilled in the art will understand that the system 10 will provide services for many customers through their mobile stations, although for simplicity, only three mobile stations 11 are illustrated. For SMS services, for example, VZW customers are assigned or homed to the SMSCs 49. SMS customers of the other carrier are assigned or homed to the SMSCs 29. An incoming message intended for delivery to an assigned subscriber's mobile station 11 will be delivered by SMSC assigned to that mobile station 11 via the MSC that is currently serving the mobile station 11.

For purposes of discussing later examples, we will assume that a VZW subscriber's mobile station $11_v$ is currently registered for service via the home VZW network 40. The SMS service for the station $11_v$ is homed on the SMSC 49 in the VZW network 40. Similarly, we will assume that a subscriber's mobile station $11_o$ is currently registered for service via the other carrier's network 20. The SMS service for the station $11_o$ in our example is homed on the SMSC 29 in the network 20. Although SMS user messages can be sent back and forth between any two mobile stations 11 and can be received and in most cases sent to other data devices such as 35 and/or 37, the prepaid signaling examples, regarding SMS communications via system 10, will focus on discussions of mobile originated message communications intended for sending an SMS type user message from the mobile station $11_o$ to the mobile station $11_v$. The signaling procedures and messages for other SMS communications are generally similar to one or more of the mobile originated examples.

A carrier, such as VZW, or a third party service provider will operate a server 15, to support offering of various services on a prepaid basis. The prepaid server 15 manages customers' prepaid accounts. The server 15 typically does not send or receive user traffic. The server 15 instead sends and receives signaling messages, to and from various network elements, to perform prepaid accounting "transaction" functions and to enable appropriate control of network service operations. An example of a suitable prepaid platform SurePay® from Lucent Technologies. The SurePay® platform typically connects to one or more of the MSC switches 25 or 45 and/or to the SS7 signaling links going to/from the STPs 27, 47 and to SMSCs and to other network nodes providing service via IP. Those skilled in that art will recognize that other platforms may be used, including generic platforms programmed to operate as a secure database server coupled to the IP network 34, as represented by the exemplary server 15.

For voice telephone calls, the prepaid server 15 interacts with switches 25, 45 of the networks 220, 40 and/or with network nodes providing home location register (HLR) and/or visitor location register (VLR) functions to provide prepaid accounting and management of account related information for controlling such calls, in a manner well known in the art. In advanced systems such as that shown in FIG. 1, the prepaid server 15 provides a unified prepaid service control for voice calls and for all other types of services offered through the system 11, including short message service (SMS). For prepaid SMS messaging services, the server 15 communicates with one or more of the SMSCs 49.

In the illustrated example, servers such as the prepaid server 15, the AAA servers or servers that might be used to implement the SMSCs 29 and 49 are intended to represent a general class of data processing device commonly used to run "server" programming. Each such device typically runs a general server type program and one or more application programs on top of the server programming, to implement the respective functionality. Such a device typically utilizes general purpose computer hardware to perform its respective server processing and to perform the attendant communications via the network(s). Each server 15, 29 or 49 for example includes a data communication interface for packet data communication, and the servers implementing the SMSCs 29, 49 further include interfaces to SS7 links to the appropriate STPs. Each server also includes a central processing unit (CPU), in the form of one or more processors, for executing program instructions. The server platform also includes program storage and data storage for various data files to be processed and/or communicated by the particular server. The hardware elements operating systems and programming languages of such servers are conventional in nature, and it is presumed that those skilled in the art are adequately familiar therewith.

In the system 10 of FIG. 1, the billing/accounting for SMS messaging service is unrelated to the underlying transport. The carriers typically charge for such services by the message. In a postpay application, the carrier would charge a set number of cents per message (although the amount may vary depending on time of day, intended recipient, or other factors). For a prepaid application, an SMS customer would purchase a set number of messages or a set value for message communications. A combined service might allow purchase of a number of air time minutes for voice calls and a set number of messages, or the purchase may involve a dollar amount that can be allocated to air time or to number of messages, dynamically as the customer uses the prepaid services.

The signaling interface between each of the SMSC's 49 and the prepaid server 15 supports a BalanceCheck transaction, which allows a message center to check the remaining balance in a prepaid subscriber's account. The signaling interface also supports a DebitAccount transaction that allows a message center to request the prepaid server to apply a charge against the subscriber's account for a message the subscriber has sent or received. In accord with the present teachings, one or more of the signaling messages for prepaid accounting transactions (and possibly messages for other accounting transactions) are enhanced by addition of new parameters, examples of which include an address list parameter (ConnectedAddressList parameter), an indicator if an exception applies (ExceptionIndicator parameter), and an indicator to override normal treatment based on an otherwise applicable service accounting policy (PolicyOverrideIndicator parameter).

The specific encoding of these new information elements would, of course, depend on the protocol used across the prepaid charging interface, and there are many protocols that could be used, e.g., XML, LDAP, etc, but logically:

The ConnectedAddressList can be viewed as a comma separated sequence of one or more addresses:
  a. Not beginning with a comma;
  b. Not ending with a comma; and
  c. Not having two consecutive commas.

For instance, the following would be examples of valid values:
  "9238341223"
  "9238341223,9088723456"
  "9238341223,9088723456,7034561213,abc@xyz.com"

And the following would be invalid:
  An empty string;
  Any string beginning with a comma;
  Any string ending with a comma; and
  Any string with two or more consecutive commas.

The ExceptionIndicator can be viewed as a 1-digit decimal number (only 0 . . . 9 as valid characters) with two values defined:
  Value "0" is to be used for "No Exception"
  Value "1" is to be used as "Exception"
  The default value is "0"
  Other values are reserved.

The PolicyOverrideIndicator can be viewed as al-digit decimal number (only 0 . . . 9 as valid characters) with two values defined:
  Value "0" is to be used for "NO OVERRIDE"
  Value "1" is to be used as "OVERRIDE."
  The default value is "0".
  Other values are reserved.

Message center policy, at an SMSC 49 in the example of FIG. 1, would determine whether the ConnectedAddressList should be included or omitted from any particular BalanceCheck transaction request signaling message or DebitAccount transaction request signaling message sent by a message center across the prepaid charging interface to a prepaid server 15. When the ConnectedAddressList is included, the contents of the ConnectedAddressList would depend on whether the BalanceCheck or DebitAccount transaction was triggered by a prepaid subscriber initiated user message or by a user message being sent to a prepaid subscriber. For a prepaid subscriber initiated user message, the ConnectedAddressList, if included, would carry the list of addresses of all the destinations to which the message is being sent. Some messaging services, e.g., CDMA SMS, only allow a single destination; others, e.g., MMS, allow multiple destinations. For a user message being sent to a prepaid subscriber, the ConnectedAddressList, if included, would carry the address of the source from which the message was sent.

As one example of the use of the ConnectedAddressList, a CDMA SMS message center's policy might specify that when the BalanceCheck or DebitAccount transaction is triggered by a prepaid subscriber initiated SMS type user message, the ConnectedAddressList would be included if the SMS_OriginalDestinationAddress is a number from the Telephony Numbering Plan or from a Private Numbering Plan, but otherwise be omitted. The policy might further specify that when the BalanceCheck or DebitAccount transaction is triggered by an SMS type user message being sent to a prepaid subscriber, the ConnectedAddressList be included if the SMS_OriginalOriginatingAddress is a number from the Telephony Numbering Plan or from a Private Numbering Plan, but otherwise be omitted.

As another example of the use of the ConnectedAddressList, a MMS message center's policy might specify that when the BalanceCheck or DebitAccount transaction is triggered by a prepaid subscriber initiated MMS type user message, the ConnectedAddressList be included if the address of every destination is an E.164 number, but otherwise be omitted. In this example, the policy might further specify that when the BalanceCheck or DebitAccount transaction is triggered by an MMS user type message being sent to a prepaid subscriber, the ConnectedAddressList be included if the Originating Address is an E.164 number, but otherwise be omitted.

The message center policy would also determine whether the ExceptionIndicator should be included or omitted from any particular BalanceCheck transaction or DebitAccount transaction sent by a message center across the prepaid charging interface to a prepaid server. When the ExceptionIndicator is included, message center policy would also determine the value to which it is set.

As one example of the use of the ExceptionIndicator, a policy for a CDMA SMS message center such as 49 might specify that when the BalanceCheck or DebitAccount transaction is triggered by a prepaid subscriber initiated SMS message, the ExceptionIndicator be included (set to indicate "Exception") if the user message is being sent to a "special" destination, e.g., an international destination, but otherwise be omitted. In this case, the policy might further specify that when the BalanceCheck or DebitAccount transaction is triggered by an SMS message being sent to a prepaid subscriber, the ExceptionIndicator be included (set to indicate "Exception") if the user message originated from a "special" source, e.g., an international source, but otherwise be omitted.

As another example of the use of the ExceptionIndicator, a MMS message center's policy might specify that when the BalanceCheck or DebitAccount transaction is triggered by a prepaid subscriber initiated MMS message, the ExceptionIndicator be included if any of the destinations to which the user message being sent is a "special" destination, e.g., an international destination, but otherwise be omitted. In this example, the policy might further specify that when the BalanceCheck or DebitAccount transaction is triggered by an MMS message being sent to a prepaid subscriber, the ExceptionIndicator be included (set to indicate "Exception") if the user message originated from a "special" source, e.g., an international source, but otherwise be omitted.

With message center policy as described in these examples, a service provider could offer a variety of free messaging buckets to its prepaid subscribers (or to a select group of its prepaid subscribers), including (but are by no means be limited to) free "buckets" of messages, for user messages intended to be sent to or received from:
  The service provider's other subscribers;
  Destinations or sources from the subscriber's own country (or state or city); and
  Destinations or sources on a list provided by the subscriber (e.g., a list of select friends, family members, or close business associates).

However, special cases could be excepted, e.g. upon receipt from an international source or an attempt to send to an international destination.

Prepaid server policy would determine whether the PolicyOverrideIndicator should be included or omitted in the response it sends to a message center in its response to any particular BalanceCheck transaction or DebitAccount transaction. When the PolicyOverrideIndicator is included, prepaid server policy would also determine the value to which it is set.

As one example of the use of the PolicyOverrideIndicator, a policy of a prepaid server 15 might specify that when the prepaid server 15 responds to a BalanceCheck or DebitAccount transaction from a message center 49, the PolicyOverrideIndicator be included (set to indicate "Override") to indicate that a free messaging bucket applies to the user message that triggered the BalanceCheck or DebitAccount transaction, but otherwise be omitted.

This would allow service providers to optimize message center policy, so that message centers such as 49 can interact more intelligently with prepaid services that offer such messaging buckets. For instance, a message center policy that would otherwise "block" user messages sent by or to an out of balance prepaid subscriber could be adjusted to allow such messages to be processed and delivered if the PolicyOverrideIndicator is received in response to a BalanceCheck or DebitAccount (indicating that a free message bucket applies to the user message). Similarly, a message center policy that might specify the automatic discard of all queued user messages for a prepaid subscriber when the subscriber is "blocked" could be adjusted to allow those user messages to be retained until it can be determined if the prepaid server 15 would apply a free message bucket to any of them.

To fully appreciate how these signaling enhancements might work, in practice, it may be helpful to consider some examples of 'call flows,' first with regard to several SMS message communications as might occur for a prepaid customer using the system of FIG. 1. In the examples of FIGS. 2-5, signaling for transmission and delivery of SMS type user messages is omitted, as the examples focus on the signaling messages exchanged between the message centers 49 (SMSCs in these examples) and the prepaid server 15 over the signaling interface for prepaid charging for SMS services.

As noted earlier, we will consider several mobile originated (MO) messaging examples, as the signaling procedures and messages for other SMS communications are generally similar to one or more of the mobile originated examples. For purposes of discussing the examples, assume that the VZW subscriber's mobile station $11_v$ originates a SMS message transmission to mobile station $11_o$. In such a message exchange, the SMSC 49 in the VZW network would be the originating message center, and the SMSC 29 in the network 20 would be the destination or terminating message center.

Consider first the signal flow (FIG. 2) in the case of a mobile originated SMS transmission from station $11_v$ of a prepaid subscriber to the station $11_o$, when the prepaid subscriber's account is in an unblocked condition, but a free service option (or 'bucket' of free messages) applies. In the example, with reference to FIG. 1, the mobile station $11_v$ sends the user's SMS message over the air link where it is received by an antenna 43 and BTS 41, which forward the message to the serving MSC 45. Various signaling involved in validating the mobile station, initiating service communications and actually sending the SMS message are omitted from the call flow signals of FIG. 2, as they are in accord with existing standards and should be well known to those skilled in the art.

Figure 2:
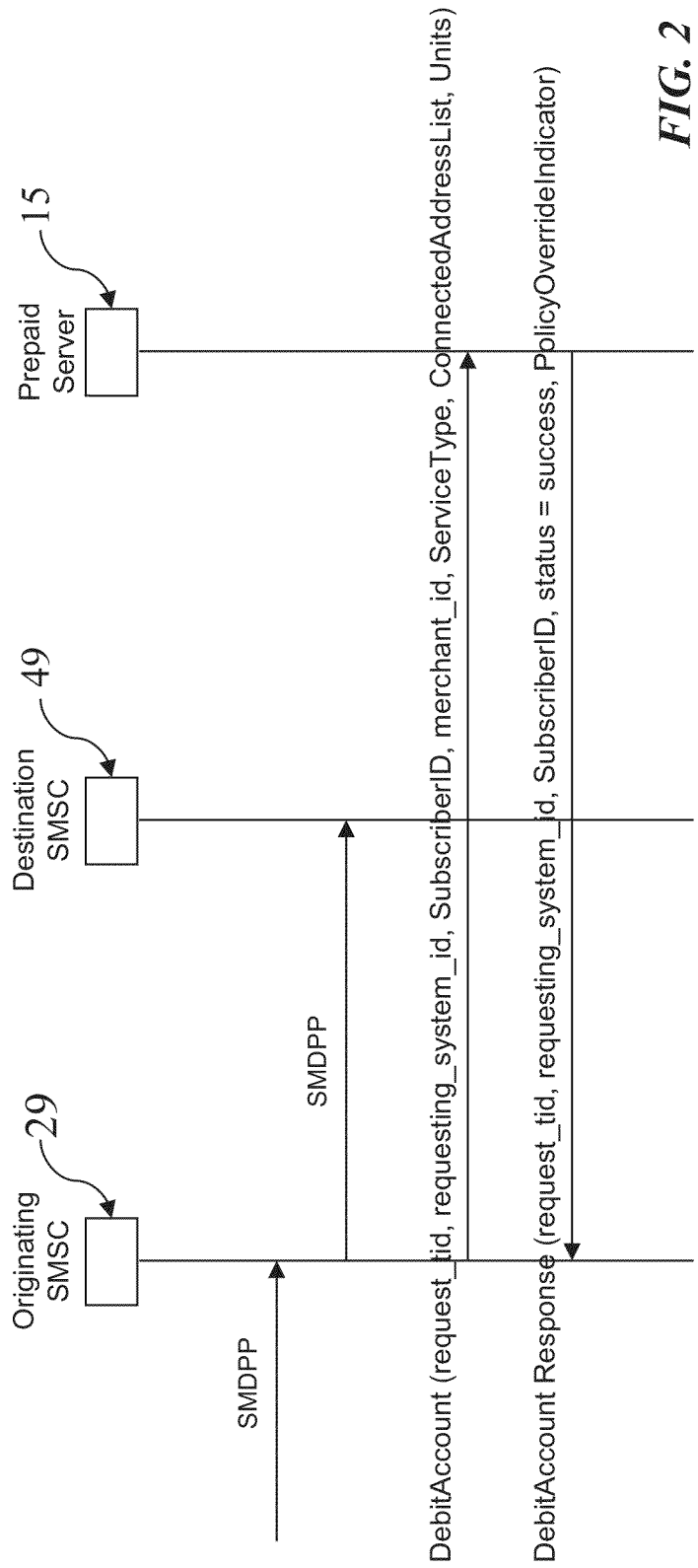
FIGS. 2 to 5 are signal flow diagrams useful in explaining various exemplary processing operations and attendant signaling features involved in providing the prepaid message service, for example SMS provided via the network of FIG. 1.

The portion of the communication illustrated in FIG. 2, that is to say the transaction related to the prepaid transactions across the interfaces between the message centers 29 and 49 and the prepaid server 15, begins when the originating SMSC 49 receives an SMDPP (short message delivery point to point) message from the MSC 45. The SMDPP contains the actual message from the user of the originating mobile station $11_v$ and related signaling information such as a destination address or identifier useful in routing the user's message through the system 10. The SMDPP message in this scenario is an example of an initial request to the message center for communication of the SMS user's message through the wireless network(s). The SMSC 49 may perform billing related functions with regard to the sender, for example, by creating a billing record if the subscriber associated with the mobile station $11_v$ subscribes to a postpay version of SMS service.

In this prepaid example, the service provider has placed a greater emphasis on performance. Hence, the message center policy dictates that the user message should normally be processed before a Debit Account transaction is successfully completed. Since the home SMSC 49 for the originating mobile station $11_v$ has mobile station $11_v$ marked as unblocked, the originating SMSC 49 forwards the SMDPP containing the user's message to the destination SMSC 29 serving the mobile station $11_o$. Although not shown in the call flow, the destination SMSC 29 executes its normal procedures to deliver the message through the network 20 to the mobile station $11_o$.

The originating SMSC 49 then initiates a Debit Account transaction by sending a DebitAccount request type signaling message to the prepaid server 15. The DebitAccount request signaling message includes various identification parameters and other parameters useful in the prepaid accounting transaction. Of note for purposes of this discussion, the DebitAccount request signaling message is enhanced by the addition of one or more new parameters, in this example the ConnectedAddressList. For a user message being sent by a prepaid subscriber, as in the example, the ConnectedAddressList carries the address of the destination to which the message is sent.

The prepaid server 15 receives the DebitAccount signaling message from the SMSC 49 and determines how to process the transaction. For example, the server 15 will examine the contents of the DebitAccount signaling message and determine if any special treatment such as a free message feature should apply. This analysis can include options for certain relationships between the sending and receiving parties and/or characteristics of the sending party. The DebitAccount signaling message identifies the originating station $11_v$ in the normal manner, and in accord with the enhancement under consideration in this out-bound message example, the ConnectedAddressList carries the address of the destination to which the out-bound message was sent, in this case the address of the station $11_o$. Examples of options for free or discount treatment include free messaging for user messages sent to the service provider's other subscribers, user messages sent to destinations in the subscriber's own country (or state or city/county) and/or user messages sent to destinations on a list provided by the originating subscriber (e.g., a list of select friends, family members, or close business associates of the user of mobile station $11_v$).

In the example of FIG. 2, assume that a free bucket applies to the user message from mobile station $11_v$, under which the subscriber using station $11_v$ may receive for transport of some number of outgoing SMS messages without deduction of money from that subscriber's prepaid account. The prepaid server 15 may note the message delivery in its record of the originating subscriber's account, but it does not deduct any money from the account for the message delivery. The prepaid server 15 formulates and sends back an appropriate DebitAccount Response message. This signaling message includes a number of signaling parameters, several of which are shown in the drawing. For example, this DebitAccount Response message includes a status parameter, which in this example indicates that the Debit Account transaction was successful. The DebitAccount Response message also is enhanced by the addition of one or more new parameters, in this example the PolicyOverrideIndicator, which is an indicator to override normal treatment based on a set service accounting policy. In this case, the PolicyOverrideIndicator signifies that the user message should be delivered regardless of the message center policy, here because it has been deducted from a set number of free messages for the subscriber, which meet the relevant free-service condition.

In this first example, the home SMSC 49 of the originating subscriber (associated with the mobile station $11_v$) initially had mobile station $11_v$ in an unblocked condition, typically because the previous DebitAccount Response had indicated success. Since the current DebitAccount Response also indicated success, the home SMSC 49 for mobile station $11_v$ keeps mobile station $11_v$ in an unblocked condition.

For purposes of discussing a second SMS example (FIG. 3), assume now that the VZW subscriber's home SMSC 49 has mobile station $11_v$ in the blocked status when the VZW subscriber's mobile station $11_v$ attempts to send an SMS message to the mobile station $11_o$. Typically, the blocked status is set when a prior DebitAccount Response had indicated failure.

As in the earlier example, the mobile station $11_v$ sends the SMS message over the air link where it is received by an antenna 43 and BTS 41, which forward the user message to the serving MSC 45. Various signaling involved in validating the mobile station, initiating service communications and actually sending the SMS message are omitted from the call flow signals of FIG. 3, as they are in accord with existing standards and should be well known to those skilled in the art. The portion of the communication illustrated in FIG. 3, that is to say the communication of signaling messages related to the prepaid transactions across the interfaces between the message centers 29 and 49 and the prepaid server 15, begins when the originating SMSC 49 receives the SMDPP that contains the actual user message from the MSC 45. The SMDPP thus is the initial attempt at or request for prepaid message communication that triggers signaling for a prepaid type accounting transaction.

In this example, because the account is blocked at the time of arrival of the SMDPP, the originating SMSC 49 initiates a Balance Check transaction with the prepaid server 15 to see if the account has been replenished, before forwarding the message to the destination SMSC 29. The SMSC 49 sends a BalanceCheck request type signaling message to the prepaid server 15. Of note for purposes of this discussion, the BalanceCheck signaling message is enhanced by the addition of one or more new parameters, in this example the ConnectedAddressList and the ExceptionIndicator. For a user message being sent to a prepaid subscriber, as in the example, the ConnectedAddressList again carries the address of the destination to which the message is sent. The ExceptionIndicator can be used to identify a number of conditions, e.g. an international message communication or message to a premium service.

Upon receipt of the BalanceCheck signaling message, the prepaid server 15 checks the status of the account and determines the appropriate accounting treatment for this transaction. In this example, assume that the originating subscriber has purchased additional messages (paid additional money into the account). The server 15 formulates and sends back an appropriate BalanceCheck Response message. In this example, the Balance Check by the prepaid server 15 was successful, as indicated by the status parameter in the message. The message also includes a balance parameter, which indicates that the balance is greater than 0 since the subscriber has replenished the account. In this example, based on its policies the prepaid server determines that since the ExceptionIndicator was received, no bucket applies and the response message should not include any of the new/enhanced parameters.

In response to the BalanceCheck Response message indicating a positive account balance, the originating SMSC 49 changes the mobile station $11_v$'s status from blocked to unblocked. Hence, the originating SMSC 49 forwards the SMDPP containing the user's message to the destination SMSC 29 serving the mobile station $11_o$. Although not shown in the call flow, the destination SMSC 29 executes its normal procedures to deliver the user message through the network 20 to the mobile station $11_o$.

The originating SMSC 49 then initiates a Debit Account transaction by sending a DebitAccount request type signaling message to the prepaid server. Of note for purposes of discussion this example, the DebitAccount signaling message is enhanced by the addition of the ConnectedAddressList and ExceptionIndicator parameters, essentially the same as in the earlier BalanceCheck request message.

The prepaid server 15 receives the DebitAccount signaling message from the SMSC 49 and determines how to process the transaction. For example, the server 15 will examine the contents of the DebitAccount signaling message and determine if any special treatment such as a free message feature or international service exception should apply. This analysis can include options for certain relationships between the sending and receiving parties and/or characteristics of the sending party, based on the ConnectedAddressList, as outlined above in the discussion of the example of FIG. 2. The analysis also involves consideration of the value of the ExceptionIndicator parameter.

Figure 3:
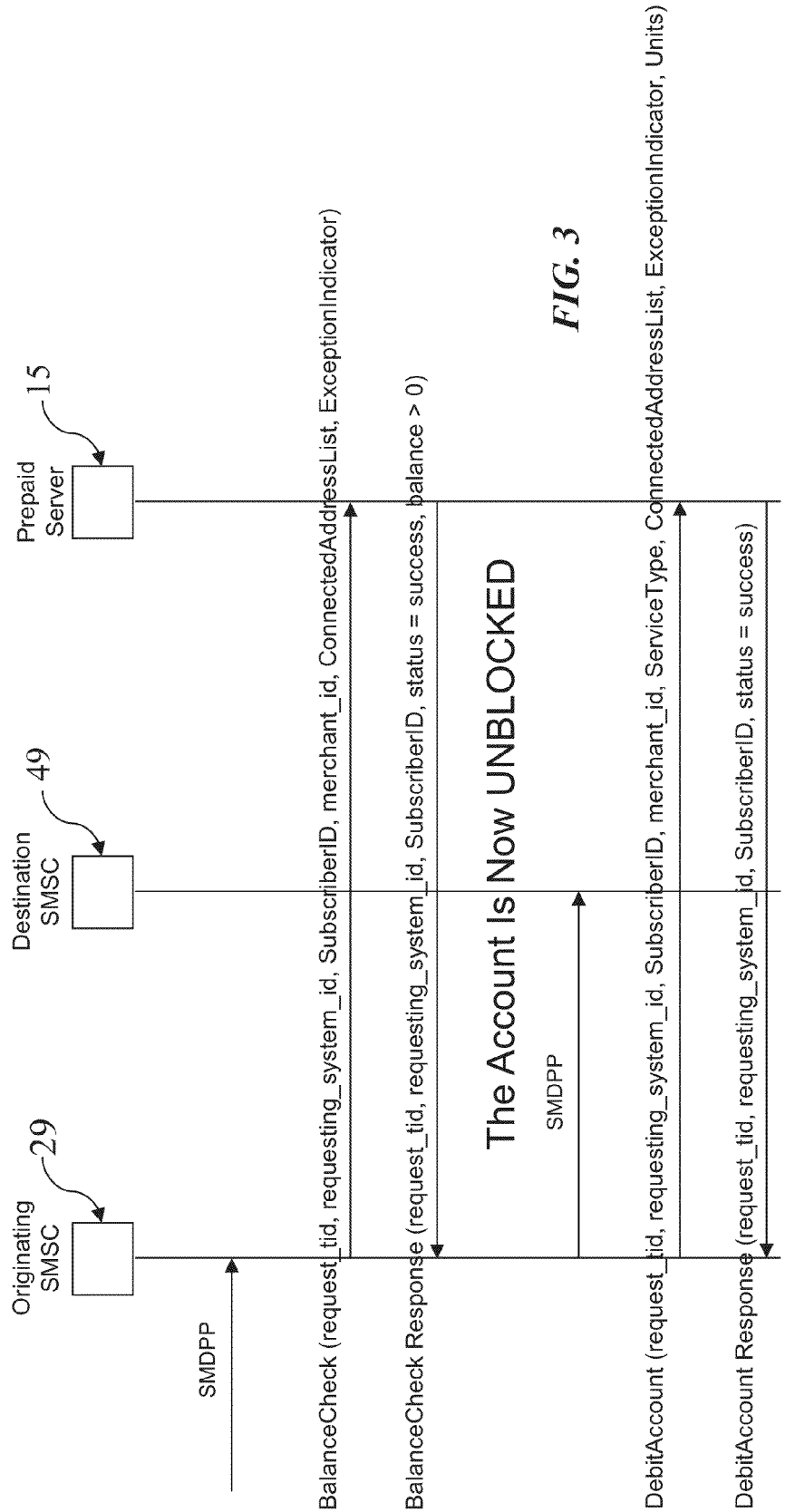
Figure 4:
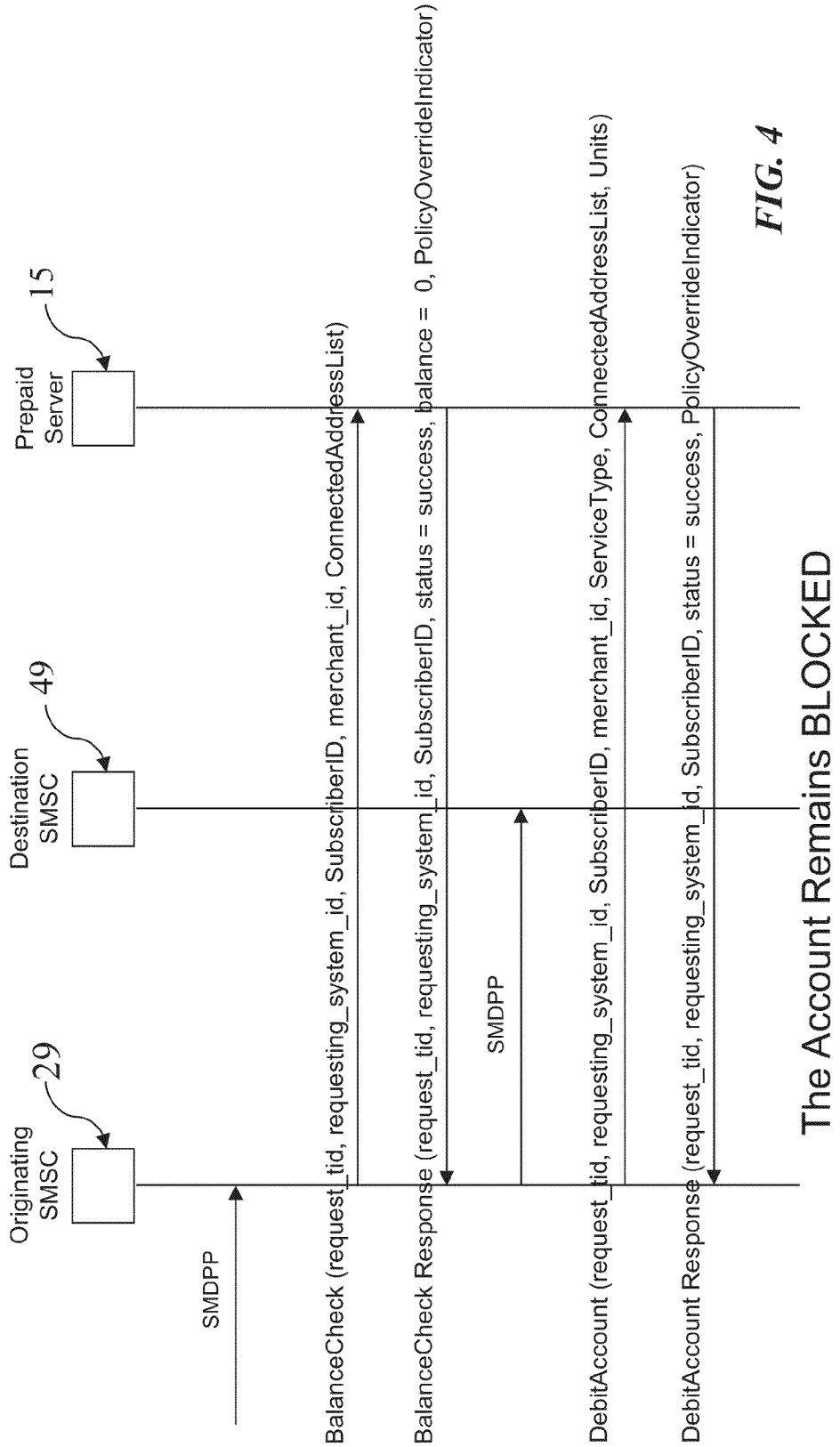

In the example of FIG. 3, the prepaid server 15 determines that the destination subscriber's account is to be charged for delivery of the message. The server 15 may apply normal charging practices, e.g. to deduct the cost for delivery of one standard message unit. However, based on the ExceptionIndicator parameter, the prepaid server 15 may apply a somewhat different charging algorithm, e.g. to deduct at a higher rate for a premium service such as international delivery.

The server 15 formulates and sends back an appropriate DebitAccount Response message. In this example, the DebitAccount Response message includes a status parameter indicating that the Debit Account transaction was successful. Based on prepaid server policy, in this example the prepaid server determines that the DebitAccount Response message should not be enhanced by the addition of one or more new parameters. Typically, the response message will not include the PolicyOverrideIndicator, when the prepaid server 15 received the ExceptionIndicator in the respective transaction request message.

In the example of FIG. 2, the SMSC 49 status for mobile station $11_v$ was unblocked but a free message bucket was available, so that the system 10 would deliver the user message without deduction from the prepaid originating subscriber's account. In the example of FIG. 3, the SMSC 49 status for mobile station $11_v$ was initially blocked due to failure of an earlier Debit Account transaction. Although no message bucket applied, the Balance Check transaction revealed that the subscriber had made a new payment to replenish the account, so that the status could be changed to unblocked and the user's message delivered. The ExceptionIndicator parameter may also have allowed the server to apply an alternate treatment, e.g. to not use a free message bucket or to apply a premium charge. For a third example (FIG. 4), now consider a case wherein, the prepaid subscriber's mobile station $11_v$ is in a blocked status but a free message bucket will apply to allow delivery of the user message, e.g. even in the absence of sufficient funds in the account.

As in the earlier example, the VZW subscriber's mobile station $11_v$ sends the SMS message over the air link where it is received by an antenna 43 and BTS 41, which forward the message to the serving MSC 45. Various signaling involved in validating the mobile station, initiating service communications and actually sending the SMS message again are omitted from the call flow signals of FIG. 4, as they are in accord with existing standards and should be well known to those skilled in the art. The portion of the communication illustrated in FIG. 4, that is to say the communication of signaling messages related to the prepaid transactions across the interfaces between the message centers 29 and 49 and the prepaid server 15, begins when the originating SMSC 49 receives the SMDPP that contains the actual user message from the MSC 45 and thereby triggers signaling across the prepaid accounting interface(s).

In this example, because the status of mobile station $11_v$ is blocked at the time of arrival of the SMDPP, the originating SMSC 49 initiates a Balance Check transaction with the prepaid server 15 to see if the account has been replenished, before forwarding the user message to the destination SMSC 29. The SMSC 49 sends a BalanceCheck request type signaling message to the prepaid server 15. Of note for purposes of this discussion, the BalanceCheck signaling message is enhanced by the addition of one or more new parameters, in this example the ConnectedAddressList. In this third mobile originated message example, because of the applicable conditions (e.g. not an international message), the policy implemented in the SMSC message center 49 causes the message center to omit the ExceptionIndicator.

Upon receipt of the BalanceCheck request signaling message, the prepaid server 15 checks the subscriber's account and determines the appropriate accounting treatment for this transaction. In this mobile originated message example, assume that the originating subscriber has not replenished (has not paid additional money into the account), and the balance in the subscriber's account remains 0. Normally a Balance Check Response showing a 0 balance would cause the message center to terminate the message delivery process, essentially discarding the user message without delivery to the intended destination station $11_o$.

However, when the prepaid server 15 examines the contents of the BalanceCheck signaling message, it will examine the ConnectedAddressList and compare the data in that parameter (e.g. the address of the destination mobile station $11_o$) to relevant data regarding one or more available free service offering buckets. In this example, the server 15 determines that a free message treatment should apply, similar to that in the example of FIG. 2.

The server 15 formulates and sends back an appropriate BalanceCheck Response message. In this example, the Balance Check by the prepaid server 15 was successful, as indicated by the status parameter in the message. The message also includes a balance parameter, which indicates that the balance is equal to 0. The BalanceCheck Response message can be enhanced with one or more of the new parameter fields, and in this example, the BalanceCheck Response message includes the PolicyOverrideIndicator, instructing the message center 49 to override normal treatment that otherwise would apply based on a set service accounting policy.

In response to the BalanceCheck Response message containing the PolicyOverrideIndicator, the originating SMSC 49 forwards the SMDPP containing the user's message to the destination SMSC 29 serving the mobile station $11_o$. Although not shown in the call flow, the destination SMSC 29 executes its normal procedures to deliver the user message through the network 20 to the mobile station $11_o$.

The originating SMSC 49 then initiates a Debit Account transaction by sending a DebitAccount signaling message to the prepaid server 15. The DebitAccount request type signaling message includes various identification parameters and other parameters useful in the prepaid accounting transaction. Of note for purposes of discussion this example, the DebitAccount signaling message is enhanced by the addition of the ConnectedAddressList parameter.

The prepaid server 15 receives the DebitAccount signaling message from the SMSC 49 and determines how to process the transaction. For example, the server 15 will examine the contents of the DebitAccount signaling message and determine if any special treatment such as a free message feature should apply. In this particular case, the analysis of the ConnectedAddressList parameter causes the server 15 to process the transaction without deducting any funds or message units from the subscriber's prepaid account, although the server 15 may note the message delivery in its record of the originating subscriber's account.

The server 15 formulates and sends back an appropriate DebitAccount Response message. In this example, this DebitAccount Response message includes a status parameter indicating that the Debit Account transaction was successful. The DebitAccount Response message also is enhanced by the addition of one or more new parameters, in this example the PolicyOverrideIndicator, still signifying that the message has been treated as a free message for the subscriber.

The account, however, remains in the blocked status, since the balance is still 0. As seen by this third call flow example, the added parameters allow the service provider to permit some messages originated by mobile station $11_v$ to go through for delivery, even while the status of mobile station $11_v$ is blocked under the normal message center policy.

For purposes of the next SMS example (FIG. 5), assume now that the VZW subscriber's mobile station $11_v$ has the status of blocked at SMSC 49 when mobile station $11_v$ attempts to send an SMS message to the mobile station $11_o$, e.g. because a prior DebitAccount Response had indicated failure, and further assume that no free-message bucket applies to this new SMS message.

As in the earlier examples, the mobile station $11_v$ sends the SMS message over the air link where it is received by an antenna 43 and BTS 41, which forward the user message to the serving MSC 45. Various signaling involved in validating the mobile station, initiating service communications and actually sending the SMS message are omitted from the call flow signals of FIG. 5, as they are in accord with existing standards and should be well known to those skilled in the art. The portion of the communication illustrated in FIG. 5, that is to say the signaling message communications related to the prepaid transaction across the interfaces between the message center 49 and the prepaid server 15, begins when the originating SMSC 49 receives the SMDPP message that contains the actual user message from the SMSC 25.

In this example, because the account is blocked at the time of arrival of the SMDPP, the originating SMSC 49 initiates a Balance Check transaction with the prepaid server to see if the account has been replenished, before forwarding the message to the destination SMSC 29. The SMSC 49 sends a BalanceCheck request type signaling message to the prepaid server 15. Of note for purposes of this discussion, the BalanceCheck signaling message is enhanced by the addition of one or more new parameters, in this example the ConnectedAddressList and the ExceptionIndicator.

Figure 5:
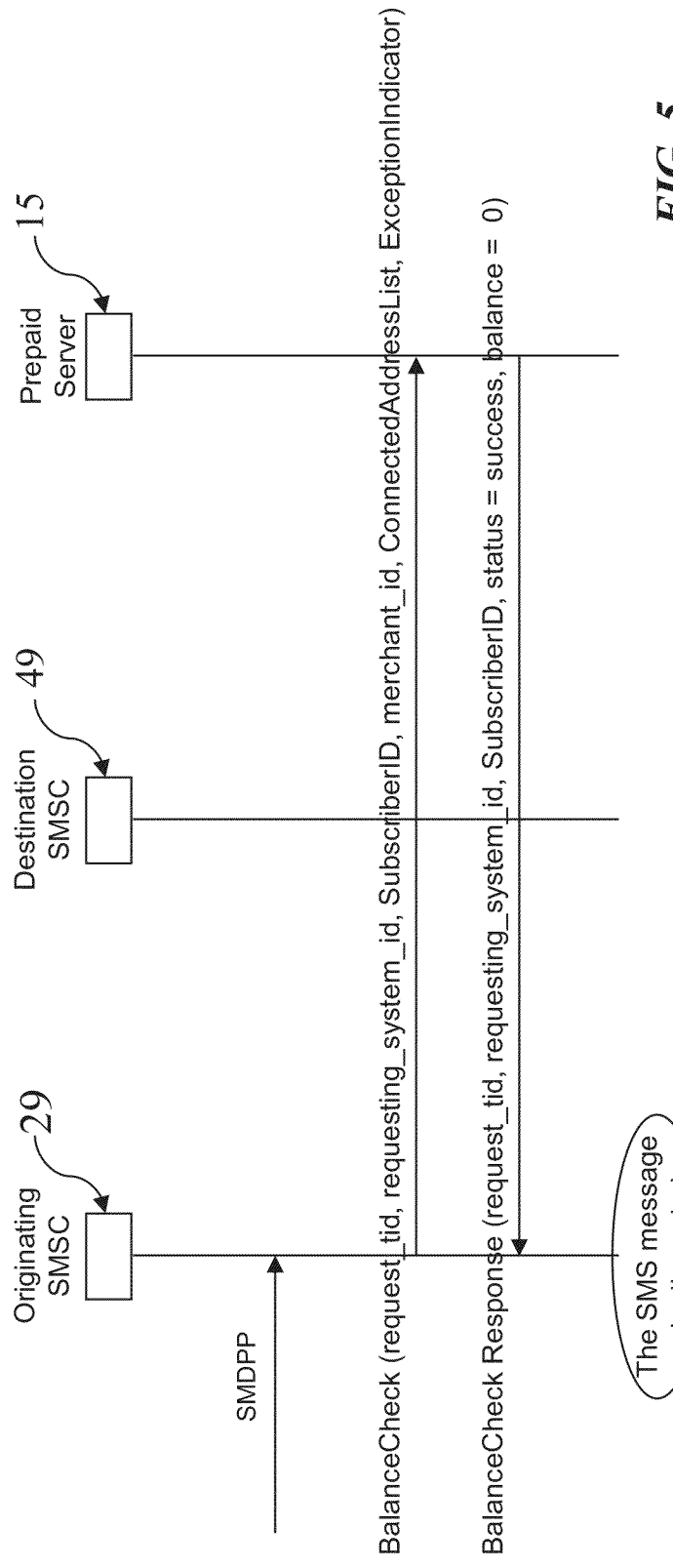

Upon receipt of the BalanceCheck signaling message the prepaid server 15 checks the account and determines the appropriate accounting treatment for this transaction. To this point, the processing in FIG. 5 is essentially the same as that in FIG. 3. However, in this example, the prepaid customer has not paid additional money on the account (has not replenished the account), therefore the balance in the account is still 0. For purposes of this example, we have also assumed that no bucket for free message delivery would apply. The free bucket(s) may not apply, for example, because the destination identified by the address in the ConnectedAddressList parameter field does not satisfy the free delivery criteria of the service provider and/or because the prepaid customer has exhausted some limit on free message services. Also, a free bucket may not apply because of the value of the ExceptionIndicator, e.g. a value signifying premium rate applies (for international delivery or the like).

The server 15 formulates and sends back an appropriate BalanceCheck Response message. In this example, the Balance Check by the prepaid server 15 was successful, as indicated by the status parameter in the message. The message also includes a balance parameter, which indicates that the balance is 0 since the subscriber has not replenished the account. This message need not include the PolicyOverrideIndicator. If included, the PolicyOverrideIndicator value would indicate that the normal prepaid processing policy should not be overridden.

In response to the BalanceCheck Response message indicating balance equals 0 and without an override indication, the originating SMSC 49 discards the received SMS message, that is to say without forwarding to the destination SMSC or delivery to the intended recipient.

The examples of FIGS. 2 to 5 related to SMS message service through a network or system, such as the system 10 illustrated in FIG. 1. Those skilled in the art will recognize, however, that the signaling enhancements discussed herein are readily adaptable to other networks and/or other message service offerings. The wireless carriers have recently begun offering advanced data services via packet-centric network architectures, and such advanced network architectures in turn support enhanced messaging services, such as a multimedia messaging service (MMS), which allows communication or downloading of voice messages, pictures and video clips, as well as the more traditional text messages to and from various users. To appreciate extension of the prepaid charging interface enhancements to the more advanced network architectures and to MMS services or the like, it may be helpful to consider examples. A discussion of an exemplary architecture will be followed by discussion of several exemplary MMS call flows.

Figure 6:
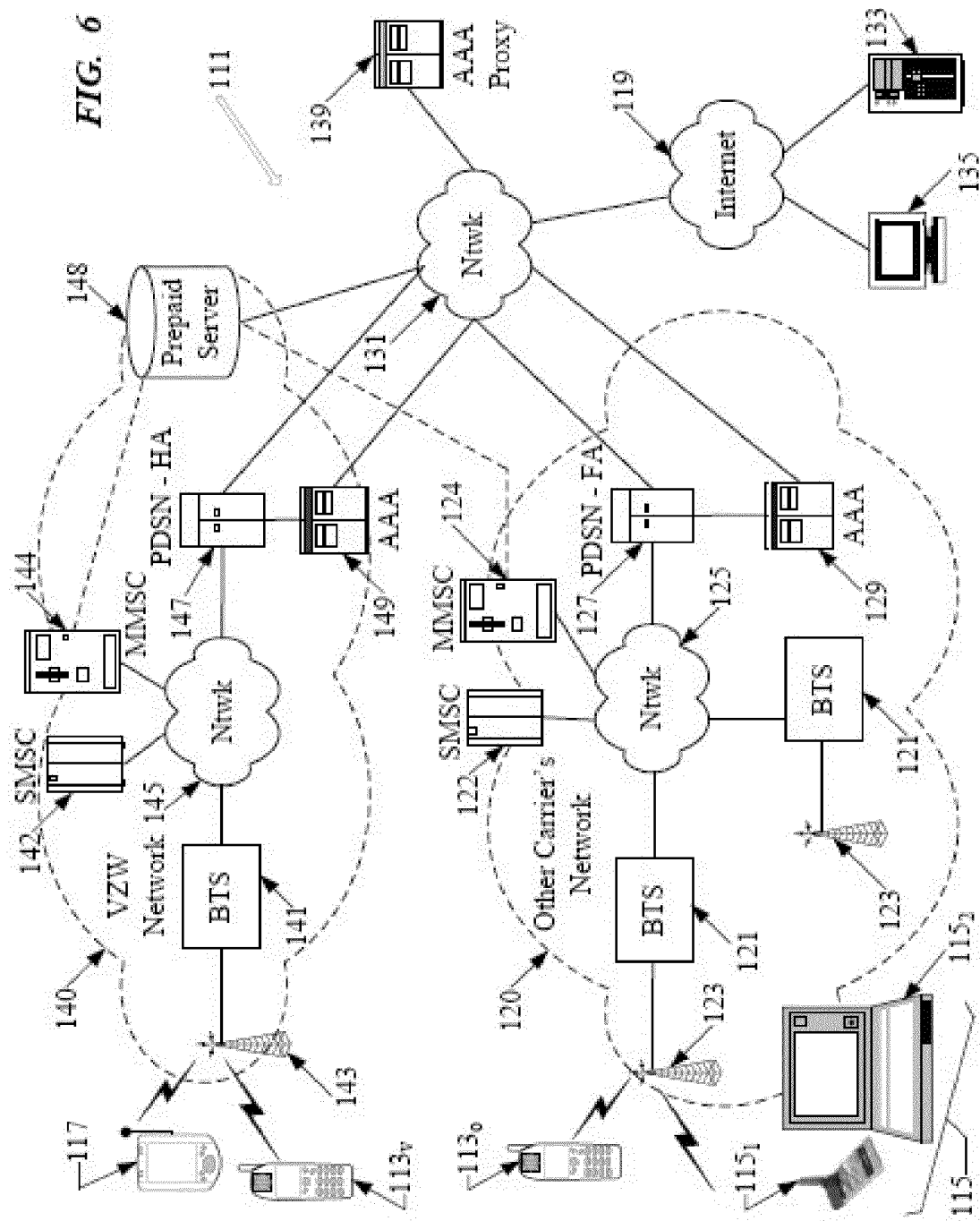
FIG. 6 is a simplified functional block diagram of another system of mobile wireless communication networks offering various services using packet transport, including for an MMS type messaging service, wherein many of the services may be offered on a prepaid basis.

FIG. 6 is a functional block diagram of an exemplary system 111 of wireless networks for providing mobile voice telephone services and high speed data services. The present concepts are applicable to a variety of different wireless technologies supporting packet data communications services, such as WiFi, WLAN, 1xRTT, GSM/GPRS, UMTS and EVDO. For purposes of discussion only, FIG. 6 represents an EVDO type network or a 1xRTT type system.

The communication networks (120, 140 in the example) implementing the exemplary system 111 provide mobile voice telephone communications as well as packet data services, for numerous mobile stations. For purposes of later discussion mobile stations 113, 115 and 117 appear in the drawing, to represent examples of several different types of the mobile stations that may receive different packet data services via the system 111. A station 113, for example, may take the form of a mobile telephone station, enhanced with display and user input capabilities to support certain text and image communications, such as text messaging, email, picture and/or video communication and web browsing applications. Today, such mobile telephones typically take the form portable handsets, although they may be implemented in other form factors.

The station 115 is a portable computing device, specifically, comprising a wireless modem card 115₁ inserted into a handheld or laptop personal computer (PC) 115₂ or the like. Although shown as a separate card, the modem 115₁ may be integrated into the PC 115₂. Alternatively, the PC 115₂ may connect to a handset device, similar to the handset type mobile station 113. The station 117 takes the form of a personal digital assistant (PDA) or Blackberry type device incorporating a wireless transceiver compatible with the particular type of packet data service offered by the system 111. Of course, the mobile stations with packet data communication capabilities may take other forms or connect to a variety of other data devices that may enable use of the network communication services.

The system 111 may allow users of the mobile stations to initiate and receive telephone calls to each other as well as through the public switched telephone network (not shown). For purposes of this discussion, the system 111 enables any and all users of the mobile stations 113, 115 and 117 to initiate and receive various other forms of user traffic via packet switched data communications, for example to or from the public data network 119 referred to as the Internet. Some of the users of the mobile stations will subscribe to voice and/or data services under one or more postpay service plans offered by a carrier or service provider. However, the users or subscribers of other stations will subscribe to voice and/or data services under a prepaid plan, in which they pay in advance for an amount of communication service. In the MMS examples, usage is measured by number of messages sent and received, although the cost per message may vary under certain circumstances, e.g. between domestic and international delivery or based on media type of the MMS message.

The packet data services through the system 111 may allow communications with other networks such as private intranets (not shown). The packet data communications allow users of the mobile stations to send to or receive data from other digital devices that otherwise have access to the Internet 119, such as servers 133, hosts and personal computers 135 coupled to the Internet 119, as well as to or from other mobile stations.

The system 111 provides the various wireless communication services in accord with at least one digital radio protocol although for voice telephone services, the network may also support one or more legacy analog or digital protocols. The illustrated system 111 supports a variety of multimedia voice and data services, using digital packet communications over the air link. In an EVDO implementation, supported services include Voice over IP (VoIP) type telephone communications, as well as high-speed web browsing, just to name two exemplary services. In a 1xRTT implementation, the system would carry voice communications as separate circuit switched communications, although those communications also typically utilize a digital communication protocol.

The system 111 may comprise access networks operated by a large number of separate and independent service providers or "carriers." For discussion purposes, the drawing shows two such radio access networks (RANs) 140 and 120, which we will assume are operated by two different carriers (VZW and another carrier), although those skilled in the art will recognize that large carriers operate a number of such networks and that many countries have more than two mobile carriers that offer or soon will offer packet data communication services. Through the carriers' access networks 120 and 140, the overall system 111 offers mobile communications to customers using mobile stations throughout a wide geographic area.

Physical elements of a radio access network (RAN) 120, operated by one of the other carriers, include a number of base stations represented in the example by the base transceiver systems (BTS) 121, each of which communicates via an antennae system 123 at the site of base station and the air-link with one or more of the mobile stations 113, 115 and 117, when the mobile stations are within range. Each base station typically includes a BTS 121 coupled to several antennae mounted on a radio tower within a coverage area often referred to as a "cell." The BTS 121 is the part of the radio network that sends and receives RF signals to/from the mobile stations that the base station currently serves.

The network 120 also includes a traffic network 125, which carries the user communications for the mobile stations 113, 115 and 117. In a 1xRTT implementation, the network 125 includes a number of radio access network switches, typically modern versions of mobile switching centers (MSCs) or Mobile Telephone Switching Offices (MTSOs), which support both cellular voice and packet data services. Each such switch connects through trunk circuits (not shown) to a number of the BTS base station transceivers 121, which the respective switch serves and controls. In an EVDO (evolution data only) implementation, the network 125 is a high-speed packet switched data network comprising a number of packet switches/routers connected to the BTS base station transceivers 121.

The BTS 121 at a base station assigns and reassigns channels to the mobile stations 113, 115 or 117 that it serves and monitors the signal levels to recommend hand-offs to other base stations. The network 125 typically includes a base station controller (BSC) functionality that controls the functions of a number of base stations and helps to manage how calls made by each mobile station are transferred (or "handed-off") from one serving base station to another. Each wireless network equipment vendor implements this function differently. Some vendors have a physical entity, which they call a BSC, while other vendors include this functionality as part of their switch (not shown).

The network 120 also includes a number of Packet Data Serving Nodes or "PDSNs" 127 coupled to the traffic network 125. The PDSN is a fixed network element introduced in the architectures for 3g wireless networks, to support packet-switched data services. Each PDSN 127 establishes, maintains and terminates logical links to the associated portion of the radio access network 120. The PDSNs also support point-to-point (PPP) user data sessions with the mobile stations. The PDSNs provide the packet routing function from the radio network to/from other packet switched networks, represented generally by the private network 131 of the carriers and the Internet 119, in the drawing.

The PDSN 127 initiates Authentication, Authorization and Accounting (AAA) signaling communications to an AAA server 129, for example, via a secure private packet network (not separately shown), for each mobile station client seeking packet communications. The server 129 provides Authentication, Authorization, and Accounting (AAA) functions for packet data calls in a cdma2000-1x (1xRTT) type network or an EVDO type network, such as the network 120. Such servers authorize service subscriptions, service profiles, and customized services. The AAA server 129 also performs a variety of accounting functions, including starting an accounting record, maintaining an interim accounting record, and stopping an accounting record, for each packet data communication service session in response to various messages from the PDSN(s) processing the data session. The PDSN 127 receives service parameters for the mobile station, operating as a mobile client, from the AAA server 129. The PDSN 127 also collects usage data for accounting purposes, which it relays to the AAA server 129.

In a 1xRTT network implementation, the network 125 utilizes switched digital links through MSC or MTSO types switches for circuit switched calls and a packet data network for packet traffic. In an EVDO implementation, the network 125 is a packet network, and the link or network to the AAA server 129 may utilize the same routers/switches and links to carry the various packet communications.

Although different radio access networks may utilize different technologies or architectures, for discussion purposes it is assumed that the RAN 140 is generally similar to the RAN 120. Like the network 120, the physical elements of the radio access network (RAN) 140, include a number of base stations represented in the example by the base transceiver system (BTS) 141. Each BTS 141 communicates via an antennae system 143 at the site of base station and the air-link with one or more of the mobile stations, 113 and 117 in the example, when the mobile stations are within range. The network 140 also includes a traffic network 145, which carries the user communications for the mobile stations 113, 115 and 117. As in the network 120, the traffic network 145 may utilize modern versions of mobile switching centers (MSCs) or Mobile Telephone Switching Offices (MTSOs), which support both cellular voice and packet data services; or the network 145 may utilize a number of packet switches/routers to provide a high-speed packet switched data network.

The network 140 also includes a number of Packet Data Serving Nodes or "PDSNs" 147 coupled to the traffic network 145. The PDSN 147 performs functions similar to those of the PDSN 127 in the network 120, both to provide packet switched routing services and to perform the validation and billing related functions. The network 140 also includes an Authentication Authorization and Accounting (AAA) server 149, analogous to the server 129.

The illustrated system 111 supports a range of packet data services for mobile users and parties communicating with those users. The packet data communications can support traditional data applications, such as browsing the Internet 119 and email or instant messaging with mobile stations or with remote computers represented generally by the server 133 and/or the personal computer (PC) or other workstation device 135. The packet data communications through the network 111 also can support Voice over IP (VoIP) type packet applications.

Different customers subscribe to service through different providers and are assigned to specific radio access networks (RAN's) 120 or 140 as their home networks; and the mobile stations and network elements are provisioned accordingly. Those skilled in the art will understand that the system 111 will provide services for many customers through their mobile stations, although for simplicity, only a few mobile stations are illustrated. For discussion purposes, assume that mobile stations 113 and 117 belong to customers of the access provider network 140. For discussion purposes only, the home carrier is referred to as carrier "VZW," therefore the network 140 is the VZW network. The subscribers owning stations 113 and 117 are VZW customers, whereas the subscriber owning station 115 is a customer of the other carrier. Hence, stations 113 and 117 are 'homed' on the network 140. Similarly, the mobile station 115 is homed on the network 120 of the other carrier. As discussed in later examples, the station $113_v$ is that of a prepaid VZW customer.

As shown, mobile station $113_v$ and 117 are operating within the service area of the home access provider network 140. By contrast, the VZW customer using the mobile $113_o$ has roamed out of the service area of its home access provider network 140 and into a different geographic area, where the mobile station $113_o$ is receiving wireless service from a different access provider network referred to as the "visited" access provider network, in this case, a network 120 operated by the other carrier.

The AAA servers interact to provide validation and location update functions, for packet data communication services. Authentication, Authorization, and Accounting (AAA) servers 129 and 149 are used for Authentication, Authorization and Accounting functions for packet data calls in a 1xRTT or EVDO type system 111. Both access networks 120 and 140 include one or more such servers 129 and 149; and there may be one or more third party trusted AAA servers 139 that serve as proxies for communications between AAA servers of different carriers. As noted, the AAA servers provide authentication for roaming mobile stations that request packet data communications services, such as the station 113.

In the preferred implementation of the system 111, all authentication, authorization and accounting transactions are performed using the RADIUS (Remote Authentication Dial-User Service) signaling protocol. RADIUS protocol has been in use for many years and is used widely in the ISP (Internet Service Provider) networks. In the network 120, RADIUS is implemented on a client-server model in which the PDSN 127 acts as the client and AAA 129 acts as the server. Similarly, in the network 140, RADIUS is implemented on a client-server model in which the PDSN 147 acts as the client and AAA 149 acts as the server.

During data session establishment by roaming subscribers, it becomes necessary to conduct certain transactions between AAA servers 129 and 149. These communications may be conducted directly via the IP network 131 or the like. In many cases, however, the AAA server 129 or 149 in each respective network 120 or 140 will communicate via the IP network 131 with a secure broker server 139 acting as an AAA proxy server. The IP network 131 could be a public network, such as a portion of the public Internet. However, because of the mission-critical nature of the AAA communications and the security and finance-related issues involved in such communications, the IP network 131 preferably is a secure packet communication network operated by one or more of the carriers or their trusted service providers.

In a mobile user's typical data session with normal postpay type accounting, the AAA functionality also provides user authentication. In the visited network 120, the AAA server 129 communicates with the AAA server 149 in the home network to authenticate the user of the roaming station 113.

A carrier, such as VZW, that offers a prepaid service will also operate a prepaid server 148, which manages customers' prepaid accounts. The server 148 typically does not send or receive user traffic. The server 148 instead sends and receives signaling messages, to and from various network elements, to perform prepaid accounting transaction functions and to enable appropriate control of network service operations. An example of a suitable platform for the server 148 is the Sure-Pay® from Lucent Technologies, although other similar platforms may be used or generic platforms may be programmed to operate as the server 148.

For voice telephone calls, the prepaid server 148 interacts with switches in the network 145 and/or with nodes providing HLR/VLR functions (not shown) to provide prepaid accounting and management of account related information for controlling the telephone calls, in a manner well known in the art. In advanced systems such as that shown in FIG. 6, the prepaid server 148 provides a unified prepaid service control for voice calls and for all other types of services offered through the system 111, such as short message service (SMS). For purposes of the present discussion, the server platform 148 also manages prepaid functions relating to multimedia messaging services (MMS).

In the example, the networks 120 and 140 also include Short Message Service Centers (SMSCs) 122, 142. The SMSC 122 connects to the network 125, for sending messages to the mobile stations. The SMSC 122 may receive incoming IP message packets through the network 125 or via other link to an IP network 119 or 131. Similarly, the SMSC 142 connects to network 145 and/or network 131 for sending and receiving various messages. The SMSC is a standard messaging computer used in cellular networks today.

The system 111 of FIG. 6 also supports multimedia messaging service (MMS). For that purpose, the network 120 includes one or more multimedia messaging service centers (MMSCs) 124, whereas the VZW network 140 includes one or more multimedia messaging service centers (MMSCs) 144. The networks may also offer access to one or more MMSCs (not shown) operated by other services providers, via communications to/from the Internet 119.

The MMSCs 124, 144 support client-server type multimedia communications as well as peer-to-peer type multimedia communications for the users of mobile stations 113, 115 and 117. For a client-server type application, a mobile station such as 113 might obtain or communicate multimedia content with an application on a server 133 via a MMSC 124. For a peer-to-peer type multimedia communication, multimedia user messages are sent from a user agent application on one user's terminal, such as 115 or 135, to a user agent application on one or more other user terminals, such as 113 and/or 117, via one or more of the MMSCs 124, 144.

Although they may be implemented in a variety of ways on one or more physical server platforms, the relevant standard calls for a MMSC to include a MMS relay functionality and a MMS server functionality. The number of relays and/or servers in a particular MMSC depends on the expected level of MMS service that the platform will support. Also, functions of the MMS relay and MMS server may be combined within a MMSC platform so as to appear as a single entity.

In the illustrated example, servers such as 122, 124, 129, 139, 142, 144, 148 and 149 are intended to represent a general class of data processing device commonly used to run "server" programming. Each such device typically runs a general server type program and one or more application programs on top of the server programming, to implement the respective functionality. Such a device typically utilizes general purpose computer hardware to perform its respective server processing and to perform the attendant communications via the network(s). Each such server for example includes a data communication interface for packet data communication. The server also includes a central processing unit (CPU), in the form of one or more processors, for executing program instructions. The server platform also includes program storage and data storage for various data files to be processed and/or communicated by the server. The hardware elements, operating systems and programming languages of such servers are conventional in nature; and it is presumed that those skilled in the art are adequately familiar therewith.

For purposes of discussing a first series of examples, assume that the user of the mobile station (MS) $113_v$ originates a MMS message transmission, and that the subscriber associated with station $113_v$ has prepaid service. In general, the sending station $113_v$ forwards the user message to the MMSC 144 serving that station $113_v$. For mobile originated MMS by a prepaid mobile station, the signaling regarding account transactions with the prepaid server, of interest here, occurs in response to the initial communication of the originating prepaid user's MMS message from the mobile station (MS) $113_v$ to the originating MMSC 144, and it occurs before MMSC 144 forwards the originating prepaid user's message toward the intended destination for that message. Discussion of several mobile originated (MO) examples with regard to FIGS. 7-9 will concentrate on the signaling involved in such transactions.

Consider first the signal flow (FIG. 7) in the case of the mobile originated MMS transmission from the station $113_v$ of a prepaid subscriber, when a special service option, in this case a free message bucket, will apply. The process with regard to the prepaid transactions begins when the originating mobile station (MS) $113_v$ sends an MMS message to the serving message center, MMSC 144, which is an example of an initial message attempting or requesting MMS communication. In an MMS type service, this initial message is a M-Send.req message from the sending user. The M-Send.req message contains the actual MMS type user message, from the user of the originating mobile station $113_v$, as well as related signaling information such as the destination address(es) of the intended recipients. For simplicity, in this example, it is assumed that the only intended recipient is mobile station $113_o$.

Initially, the MMSC 144 verifies that the subscriber is an MMS subscriber by sending an AUC.Req message to an authentication center (AUC). The AUC function may reside in a number of different platforms. The AUC sends back an AUC.Res message, which in the present example, indicates that the mobile station $113_v$ has an MMS service subscription.

Upon receiving the AUC.Res message validating the sending mobile station $113_v$, the MMSC 144 determines the cost of the MMS message to the originating mobile station $113_v$, for delivery of the message to the intended recipient. Cost may vary with several factors, such as size and type of the MMS message.

Next, the originating MMSC 124 initiates a Debit Account transaction by sending a DebitAccount request type signaling message to the prepaid server 148, e.g. through the network 131 (see FIG. 6). The DebitAccount signaling message includes various identification parameters and other parameters useful in the prepaid accounting transaction. For example, the MMSC 124 includes the calculated Amount of the cost to mobile station $113_v$ of this origination in the DebitAccount signaling message. Of note for purposes of this discussion, the DebitAccount signaling message is enhanced by the addition of one or more new parameters, in this example the ConnectedAddressList. The ConnectedAddressList parameter field carries the address(es) of the destination(s) to which the user message was sent, which in this case is assumed to be the address of mobile station $113_o$.

The prepaid server 148 receives the DebitAccount signaling message from the MMSC 144 and determines how to process the transaction. For example, the server 148 will examine the contents of the DebitAccount signaling message and determine if any special treatment such as a free message feature should apply. This analysis can include options for certain relationships between the sending and receiving parties and/or characteristics of the sending party. The DebitAccount signaling message identifies the originating station $113_v$ in the normal manner, and in accord with the enhancement under consideration in this example, the ConnectedAddressList carries the address of the destination to which the user message was sent, in this case the address of a mobile station $113_o$. Examples of options for free or discount treatment include free messaging for user messages sent to the service provider's other subscribers, user messages sent to destinations in the subscriber's own country (or state or city/county) and/or user messages sent to destinations on a list provided by the originating subscriber (e.g., a list of select friends, family members, or close business associates of the user of mobile station 1134

Figure 7:
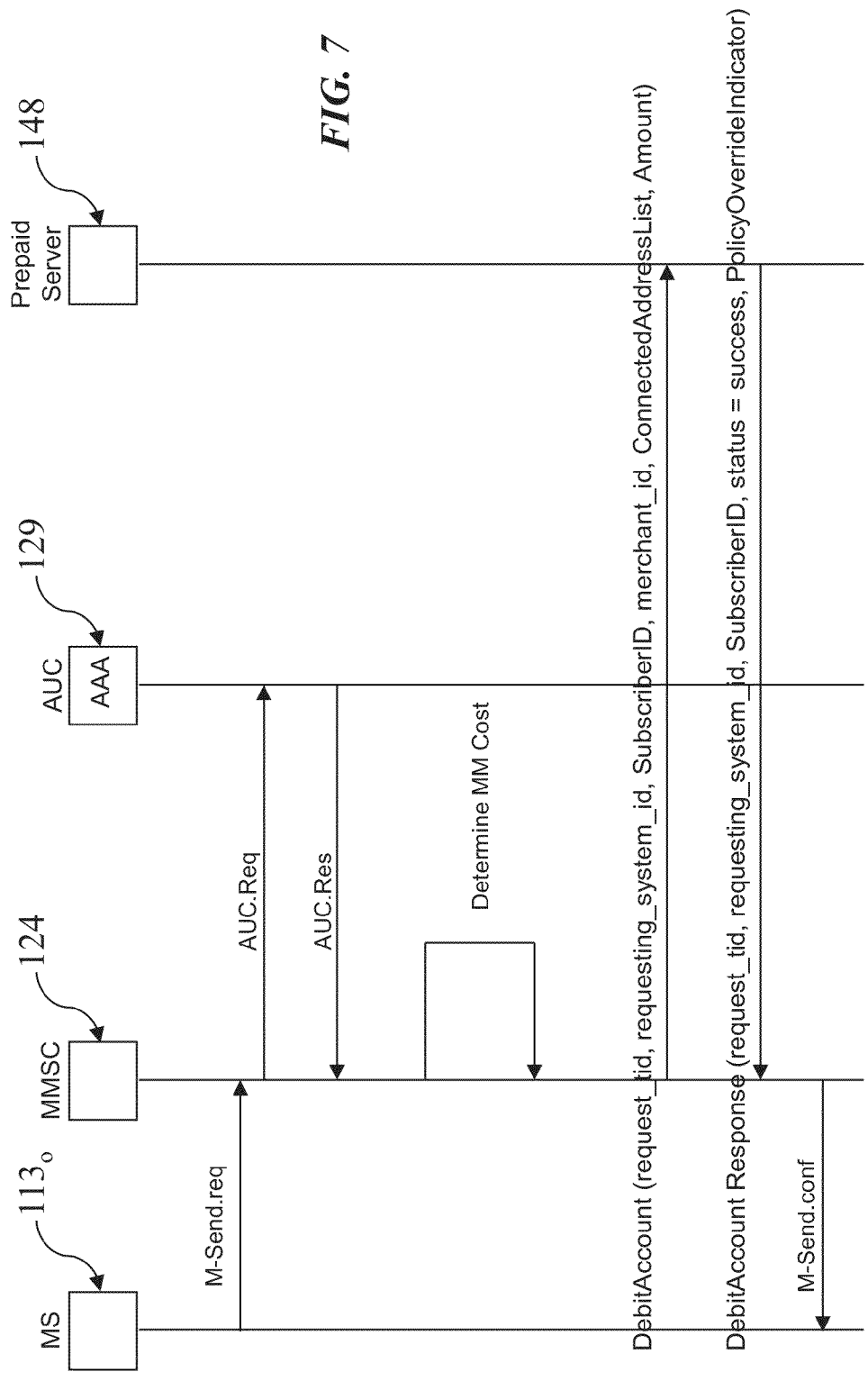
FIGS. 7 to 12 are signal flow diagrams useful in explaining various exemplary processing operations and attendant signaling features involved in providing the prepaid message service, for example MMS provided via the network of FIG. 6.

In the example of FIG. 7, assume that a free bucket applies under which the prepaid subscriber using station $113_v$ may originate some number of MMS messages or some dollar amount of free services, for user messages to appropriate recipients. The prepaid server 148 may note the user message delivery in its record of the originating subscriber's account, but it does not deduct any money from the subscriber's account for the message delivery. The server 148 formulates and sends back an appropriate DebitAccount Response message. This DebitAccount Response message includes a status parameter, which in this example indicates that the Debit Account transaction was successful. The DebitAccount Response message also is enhanced by the addition of one or more new parameters, in this example, the PolicyOverrideIndicator set to indicate "override", in the example, because the message delivery has been deducted from an applicable bucket for free messages for the subscriber, where the message meets the relevant free-service condition.

Based on the received DebitAccount Response message, with its indication of success of the Debit Account transaction, and, as shown, the originating MMSC 144 sends a message (M-Send.conf) back to the originating mobile station MS $113_v$ confirming acceptance of the MMS message originated by mobile station $113_v$ for delivery to the intended recipient, The MMSC 144 begins its standard operations to deliver the received MMS message. The subsequent communications involved in delivering the message to the destination mobile station $113_o$ are omitted from the drawing, because they use known protocols and procedures, and those skilled in the art should be familiar therewith. It should be noted that since no funds were deducted from the account, because the free bucket applied, the recipient's prepaid account balance at the server 148 has not changed.

For purposes of discussing a second MMS example (FIG. 8), assume now that, when the mobile station $113_v$ attempts to send an MMS message the MMSC 144 determines, based on its policies, that an exception applies, but that there are sufficient funds in the subscriber's account to pay for the message. As will be seen from the discussion below, the ExceptionIndicator is used to signify a condition to prevent free service, e.g. an indication that the communication is a premium communication such as a message sent to an international destination.

As in the preceding example, the relevant transaction regarding the prepaid account is triggered when the originating prepaid mobile station $113_v$ forwards the initial service request message to the MMSC 144 serving that station $113_v$ by sending an M-Send.req message to the MMSC 144 currently serving that mobile station. As in the earlier example, the M-Send-req message contains the user's MMS message. Initially, the MMSC 144 verifies that the subscriber is an MMS subscriber by sending an AUC.Req message to an authentication center (AUC). The AUC sends back an AUC.Res message, which in the present example indicates that the mobile station $113_v$ has an MMS service subscription. Upon receiving the AUC.Res message, the MMSC 144 determines the cost of the MMS message to the originating mobile station. To this point, the processing in this example is essentially the same as in the example of FIG. 7, however, cost may vary with several factors, such as size and type of the MMS message. Also, in this example, based on its policies, the MMSC 144 determines that, since one of the destinations is an international destination, it should signal an exception condition to the prepaid server 148.

Next, the originating MMSC 144 initiates a Debit Account transaction by sending a DebitAccount request type signaling message to the prepaid server 148. The DebitAccount signaling message includes various identification parameters and other parameters useful in the prepaid accounting transaction including the cost amount for delivery of the user message as determined by the MMSC 124. In this example, the DebitAccount signaling message is enhanced by the addition of the ConnectedAddressList containing the address(es) of the destination(s) to which this message is being sent and the ExceptionIndicator set to indicate that an exception condition applies.

The prepaid server 148 receives the DebitAccount signaling message from the MMSC 124 and determines how to process the transaction based on the contents of that signaling message. In this example, because of the received ExceptionIndicator parameter, the server 148 will not apply any otherwise available free message buckets.

In this example, the prepaid subscriber has a remaining account balance sufficient to cover the cost of the MMS origination. Hence, the prepaid server 148 deducts the indicated amount from the prepaid account associated with the originating mobile station 113$_v$. The prepaid server 148 then formulates and sends back an appropriate DebitAccount Response message. This signaling message includes an indication that the DebitAccount transaction was successful. The DebitAccount Response message may be enhanced with one or more of the new parameters, but in this example, none are necessary.

Based on the received DebitAccount Response message and its indication of success of the Debit Account transaction, the MMSC 144 sends a message (M-Send.conf) back to the originating mobile station MS 113$_v$ confirming acceptance of the MMS message originated by mobile station 113$_v$ for delivery to the intended recipient(s). The MMSC 144 begins its standard operations to deliver and/or forward that MMS message to each of the recipients. The subsequent communications involved in delivering the message to the intended recipient(s) are omitted from the drawing, because they use known protocols and procedures, and those skilled in the art should be familiar therewith. It should be noted that in this case the charge for the MMS origination was deducted from the account of the originating mobile station 113$_v$, since a free bucket was not applicable.

Figure 8:
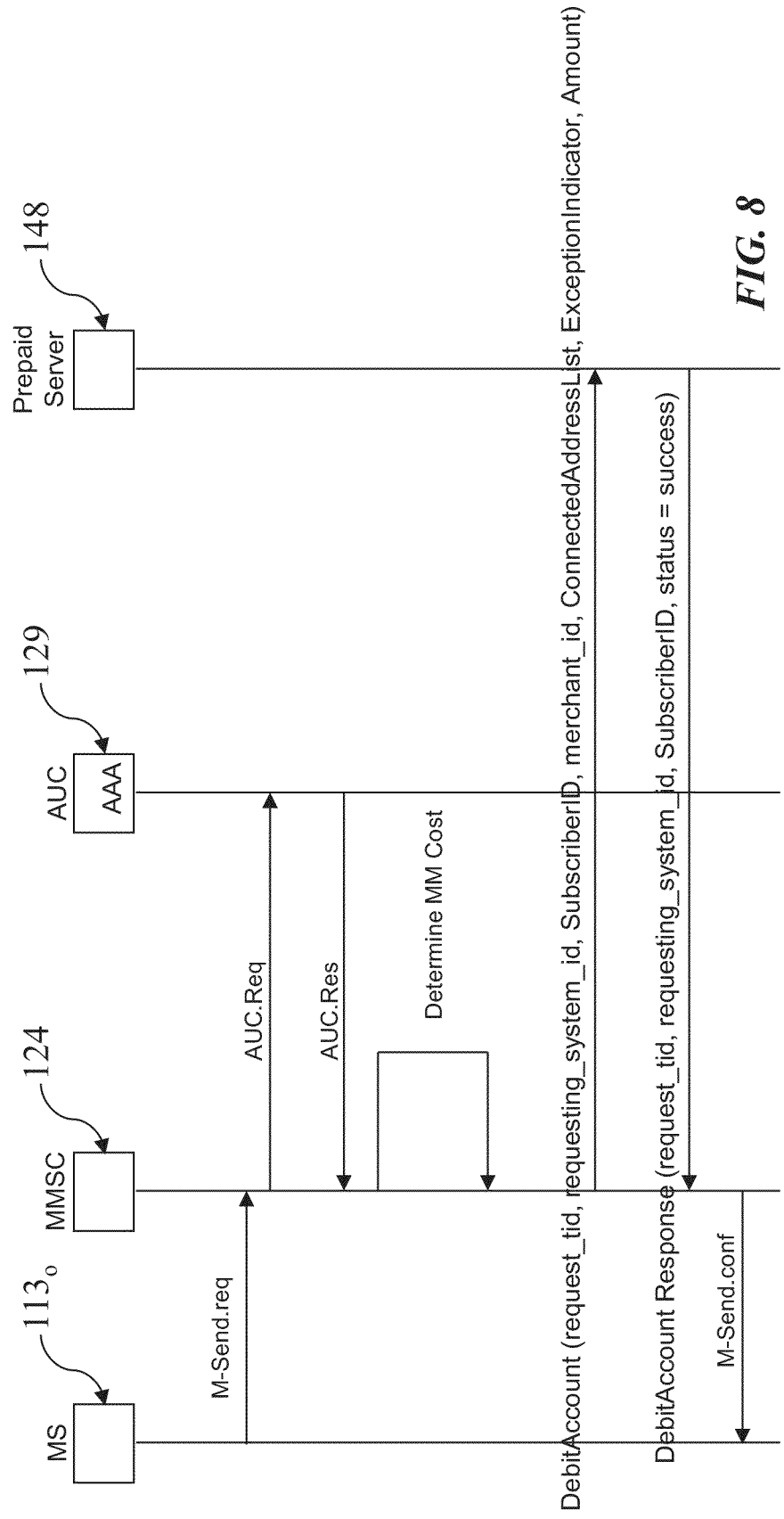
Figure 9:
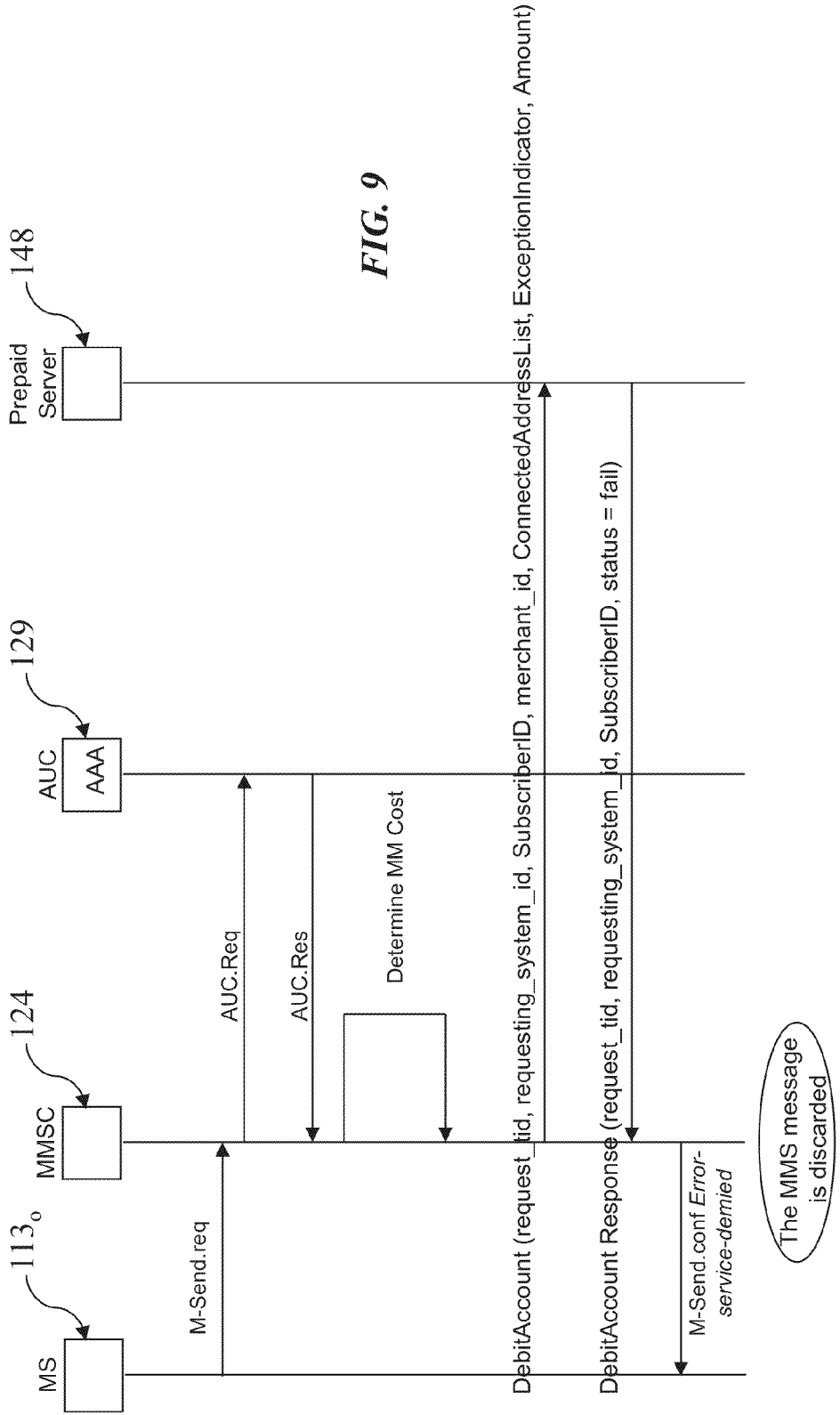

Now we will consider an example in which there are insufficient funds and no free service is available, with respect to the signal flow illustrated in FIG. 9. The example shown there proceeds exactly as in the example of FIG. 8, until the prepaid server 148 receives and processes the DebitAccount request message. The ExceptionIndicator again instructs the server not to apply a free message bucket. However, in this example, the subscriber's remaining account balance at the prepaid server 148 is inadequate to cover the cost of the MMS message origination by the prepaid subscriber's mobile station 113$_v$. The subscriber's remaining account balance may already be 0, or it may be greater than 0 but less than the cost of the MMS message origination, as indicated by the Amount parameter in the DebitAccount message received from the MMSC 144.

The prepaid server 148 formulates and sends a DebitAccount response message back to the MMSC 144. The message is generally similar to that in the example of FIG. 8, except in this latest example, because there were insufficient funds, the status indicator in this message now indicates that that the debit account transaction failed.

In response to the transaction failure indication, the MMSC 144 sends a message (M-Send.conf Error) back to the originating mobile station MS 113$_v$, indicating that the requested MMS message origination has been denied. The MMSC 144 discards the MMS message received from the prepaid subscriber's mobile station 113$_v$.

Figure 10:
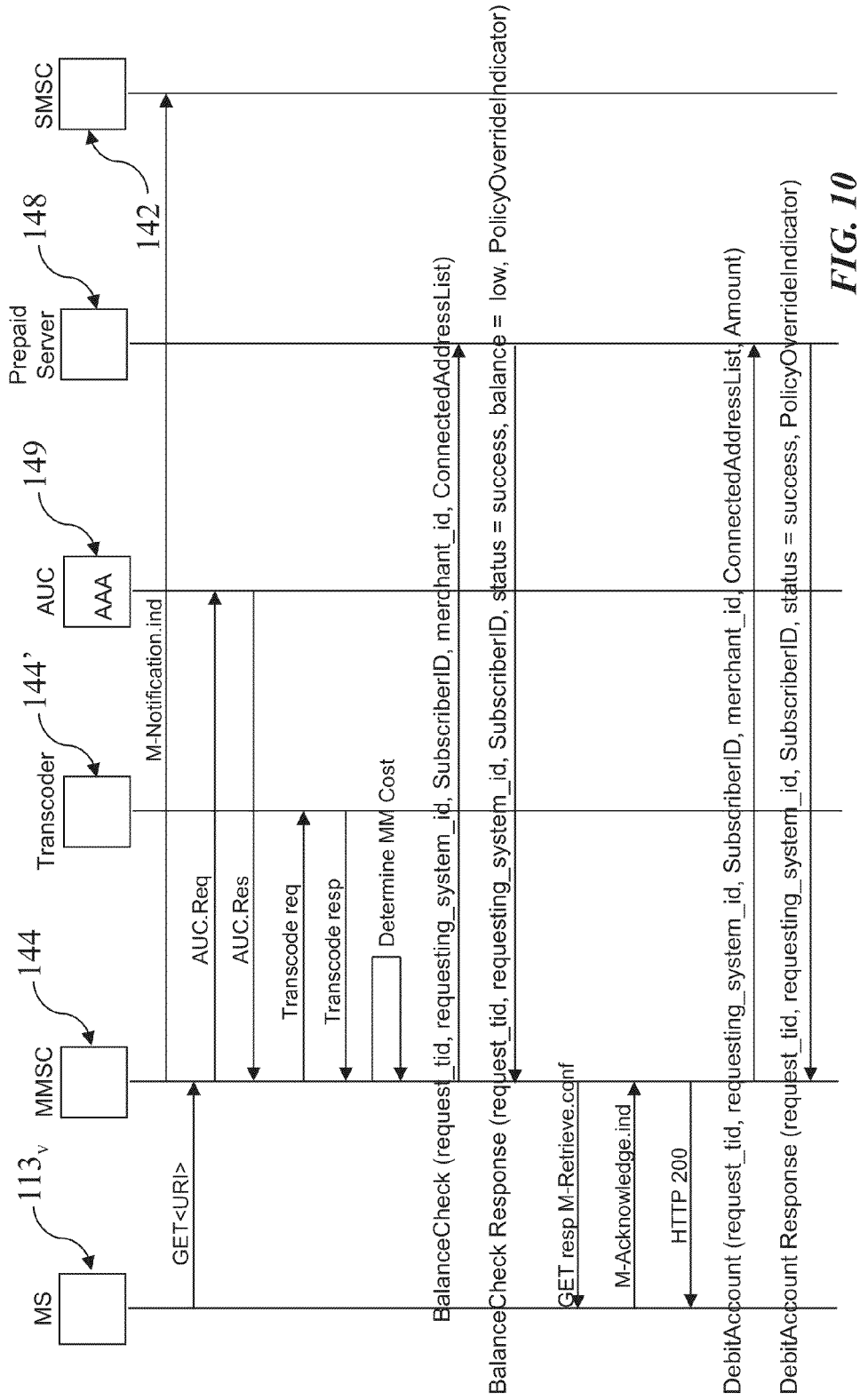

The examples of FIGS. 7-9 dealt with prepaid transactions associated to MMS message origination attempts by a prepaid mobile station. In a system 111 supporting MMS services, the prepaid transaction signaling may be somewhat different with respect to delivery of MMS messages to a prepaid mobile station 113$_v$, i.e., in the mobile terminated (MT) cases. Hence, it may be helpful to consider a few examples (with respect to FIGS. 10-12) of mobile terminated (MT) situations.

For these examples, assume that an MMS message has been forwarded to and stored in the MMSC 144 serving the VZW subscriber's mobile station 113$_v$, and that the subscriber associated with station 113$_v$ has prepaid service for messages intended for delivery to that station.

Upon receipt of this user message, the MMSC 144 serving the intended destination station 113$_v$ initiates a procedure to notify that mobile station (MS) 113$_v$. In the illustrated examples, this notification uses SMS communications, but the notification method has no bearing on the prepaid transactions between the MMS 144 and the prepaid server 148. Although a number of additional transmissions between the various elements would be involved, the drawing represents the notification procedure by its initial signaling message transmission only, that is to say the transmission of the M-Notification.ind message from the MMSC 144 to the SMSC 142, for forwarding to the mobile station (MS) 113$_v$. The signaling operations and messages used in such communications are standard in nature and will not be described in further detail here, as those skilled in the art should be familiar with such communications.

With MMS services, the subscriber can configure the mobile station to immediately initiate MMS message retrieval upon receipt of this notification, that is to say, automatically without interaction by the user. The signaling for manually initiated message retrieval is similar, so the examples discussed below will assume that the destination subscriber station 113$_v$ implements an immediate retrieval arrangement. Hence, in response to the notification that a new user message is available for delivery to the station 113$_v$, the mobile station (MS) 113$_v$ sends a GET<URI> message through the network 140 to the MMSC 144. The GET<URI> message is essentially a request to initiate a download of the user message from the MMSC 144 through the network 140 to the station 113$_v$.

The receipt of the GET<URI> message may be considered as receiving a request for MMS service at the terminating message center 144.

The MMSC 144 responds to its receipt of the GET<URI> message by sending an AUC.Req message to an authentication center (AUC) to verify that the GET message was received from an MMS subscriber. The AUC sends back an AUC.Res message, which in the present example, indicates that the mobile station 113$_v$ has an MMS service subscription.

The MMSC 144 forwards the user message to a transcode function 144' (in the Transcode.req signaling message). Upon conversion of the message to a format that is compatible with delivery to the destination mobile station 113$_v$, the transcode function 144' returns the converted user message to the MMSC 144 (in the Transcode.resp signaling message).

Next, the MMSC type message center 144 determines the cost for delivery of this mobile terminated MMS message to the mobile station 113$_v$ of the intended recipient. In these examples, cost will vary with several factors, such as size and type of the converted MMS message.

The MMSC 144 initiates a Balance Check transaction with the prepaid server to determine the ability of the account to cover the projected cost of delivery of the user message. The MMSC 144 therefore sends a BalanceCheck request type signaling message to the prepaid server 148. Of note for purposes of this discussion, the BalanceCheck signaling message is enhanced by the addition of one or more new parameters, in this example the ConnectedAddressList. For a user message being sent to a prepaid subscriber, as in the example, the ConnectedAddressList carries the address of the source from which the message was sent.

Upon receipt of the BalanceCheck signaling message, the prepaid server 148 checks the status of the account and determines the appropriate accounting treatment for this transaction. For purposes of this example, assume that based on the ConnectedAddressList parameter, the prepaid server 148 determines that a free delivery bucket applies. Examples of free delivery options that a carrier might offer have been discussed earlier. Of note, one or more such options may apply to the non-mobile sources or to some other aspect of the delivery of the user message (e.g. time of day).

The prepaid server 148 formulates and sends back an appropriate BalanceCheck Response message. This signaling message may include one or more of the enhanced parameters discussed above. In this example, the Balance Check by the prepaid server 148 was successful, as indicated by the status parameter in the BalanceCheck message. The BalanceCheck message also includes a balance parameter, from which the MMSC 144 can determine that the balance in the account can not cover the determined delivery cost. However, in this example, because the server determined that a free delivery bucket applies, the server includes the PolicyOverrideIndicator in the message, instructing the message center to override its normal policy, therefore the message center MMSC 144 continues with its process for delivering the MMS message to the mobile station 113$_v$.

The MMSC 144 sends a GET resp M-Retrieve.conf message to the mobile station 113$_v$. This message is essentially the response to the GET<URI> received from the mobile station. The GET resp M-Retrieve.conf message contains the actual MMS user message being downloaded to the mobile station. When downloading is successfully completed, the mobile station 113$_v$ responds by sending back an M-Acknowledgement, which the MMSC 144 acknowledges with an HTTP 200 message. Actual delivery of the user message to the mobile station 113$_v$ is complete at this point.

The originating MMSC 144 also initiates a Debit Account transaction, by sending a DebitAccount request type signaling message to the prepaid server 148. The DebitAccount signaling message includes various identification parameters and other parameters useful in the prepaid accounting transaction. Of note for purposes of discussion of this example, the DebitAccount signaling message is enhanced by the addition of the ConnectedAddressList.

The prepaid server 148 receives the DebitAccount signaling message from the MMSC 144 and determines how to process the transaction. In the present example, the server 148 will examine the contents of the DebitAccount signaling message and determine if any special treatment, such as a free message feature, should apply. As happened in the Balance Check transaction, the prepaid server 148 determines that a free delivery bucket applies based on the contents of the ConnectedAddress parameter received in the DebitAccount Request message.

The server 148 formulates and sends back an appropriate DebitAccount Response message. This DebitAccount Response message includes a status parameter, which in this example indicates that the Debit Account transaction was successful. The DebitAccount Response message also is enhanced by the addition of one or more new parameters, in this example the PolicyOverrideIndicator, still signifying an override of message center policy, in this case because the message was determined by the prepaid server 148 to qualify for free delivery.

Figure 11:
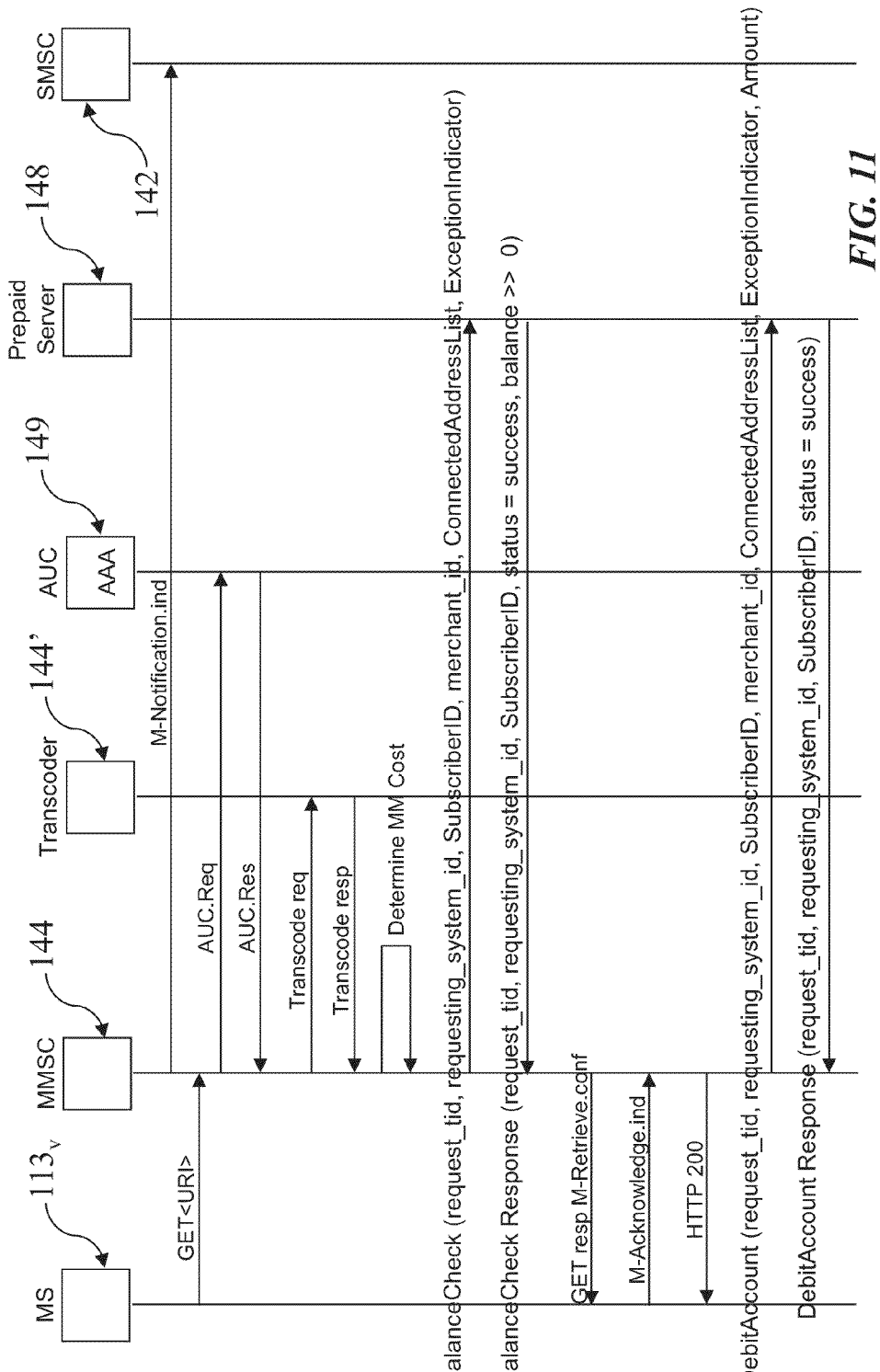

As another MMS processing example, consider now a mobile terminated (MT) situation in which no bucket applies but there are sufficient funds in the prepaid account to pay for delivery of the user message to the intended destination. FIG. 11 depicts an example of the signal flow for such a situation. The signal flow in this example is identical to that in the example of FIG. 10, until the MMSC 144 sends the BalanceCheck request message. In the example of FIG. 11, the message includes the ExceptionIndicator parameter. Here, the indicator signifies that an exception applies, e.g. because of a premium charge for international delivery or the like.

Upon receipt of the BalanceCheck signaling message the prepaid server 148 checks the status of the account and, based on the received ExceptionIndicator, the prepaid server 148 determines that the PolicyOverRideIndicator should not be included in the BalanceCheck Response message.

The server 148 formulates and sends back an appropriate BalanceCheck Response message. In this example, the Balance Check by the prepaid server 148 was successful, as indicated by the status parameter in the message. The message also includes a balance parameter, from which the MMSC 144 can determine that the balance in the account, which is significantly greater than 0 (balance>>0), is sufficient to pay for the MMS message delivery. While the BalanceCheck Response message is sometimes enhanced with one or more of the new parameter fields, this is not the case in this example because of the ExceptionIndicator that was present in the BalanceCheck Request message.

In response to the BalanceCheck Response type signaling message, with the successful status and the balance set to a value large enough to pay for the cost of the MMS message delivery, the message center MMSC 144 continues with its process for delivering the MMS message to the mobile station 113$_v$. Hence, the MMSC 144 sends a GET resp M-Retrieve.conf message to the mobile station 113$_v$. This message is essentially the response to the GET<URI> received from the mobile station. The GET resp M-Retrieve.conf message contains the actual MMS user message being downloaded to the mobile station. When downloading is successfully completed, the mobile station 113$_v$ responds by sending back an M-Acknowledgement, which the MMSC 144 acknowledges with an HTTP 200 message. Actual delivery of the user message to the mobile station 113$_v$ is complete at this point.

The originating MMSC 144 also initiates a Debit Account transaction, by sending a DebitAccount request type signaling message to the prepaid server 148. The DebitAccount signaling message includes various identification parameters and other parameters useful in the prepaid accounting transaction. One of the included parameters is the Amount determined for the cost of delivery of the MMS message. For purposes of discussion of this example, the DebitAccount signaling message is enhanced by the addition of the ConnectedAddressList and the ExceptionIndicator as in the earlier BalanceCheck request.

The prepaid server 148 receives the DebitAccount signaling message from the MMSC 144 and determines how to process the transaction. In the present example, the server 148 will examine the contents of the DebitAccount signaling message and determine if any special treatment such as a free message feature should apply. As happened in the Balance Check transaction, the prepaid server 148 determines that the free delivery buckets are inapplicable in view of the ExceptionIndicator, however in the example, there are sufficient funds on deposit in the prepaid account. The server 148 therefore deducts the amount indicated in the DebitAccount signaling message, from the recipient's prepaid account balance.

The server 15 formulates and sends back an appropriate DebitAccount Response message. For example, this DebitAccount Response message includes a status parameter, which in this example indicates that the Debit Account transaction was successful. While the DebitAccount Response message is sometimes enhanced with one or more of the enhanced new parameters, this is not the case in this example because of the ExceptionIndicator that was present in the DebitAccount Request message.

Figure 12:
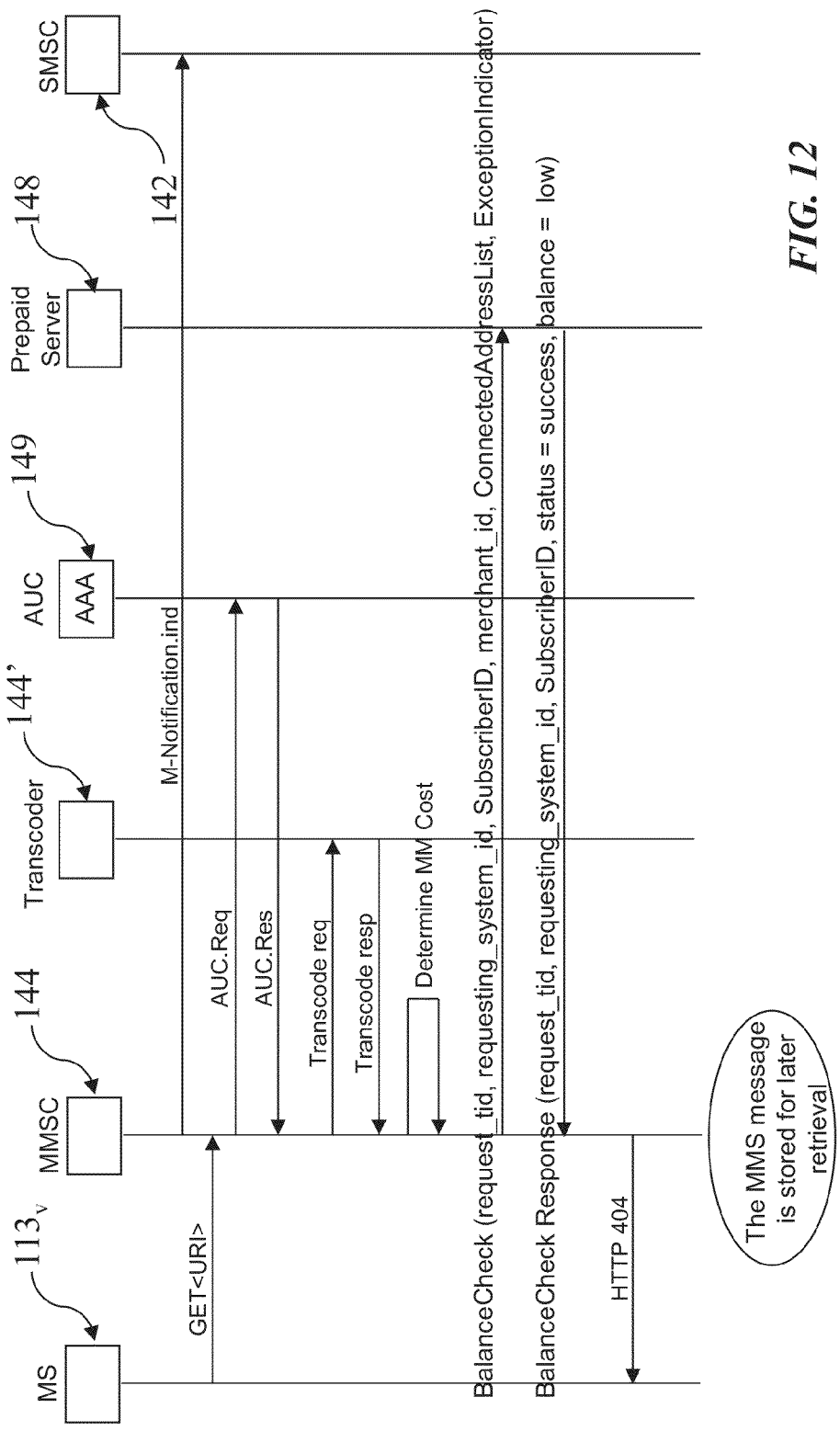

As a further MMS processing example, consider now a mobile terminated (MT) situation in which no bucket applies and there are insufficient funds in the prepaid account to pay for delivery of the user message to the intended destination. FIG. 12 depicts an example of the signal flow for such a situation. The signal flow in this example is identical to that in the example of FIG. 11, until the prepaid server 148 receives and processes the signaling message for the BalanceCheck request. In the example of FIG. 12, the message includes the ExceptionIndicator parameter. Based on this parameter, the prepaid server determines that the message is not eligible for free delivery.

The prepaid server 148 formulates and sends a BalanceCheck Response type signaling message back to the MMSC 124. The message is generally similar to those in the examples of FIG. 11, except that in this latest example the balance returned is too low to cover the cost of the MMS message delivery to the prepaid mobile station 113$_v$.

When the MMSC examines the BalanceCheck Response it determines that the subscriber's balance is too low to cover the cost to deliver the MMS and that the prepaid server has not included the PolicyOverrideIndicator. Based on this determination, the MMSC 144 sends a HTTP 404 to the mobile station 113$_v$, as the response message to the GET<URI> received from the mobile station. The HTTP 404 is a failure indication, which informs the station that the user message cannot be delivered at this time. However, the MMSC 144 will not immediately discard the MMS user message. In this example, the MMSC 144 stores the user message for some set period of time, to allow the intended recipient some time to replenish the account and request delivery again later. If not successfully delivered within a set period, the MMSC 144 will discard the user message.

As shown by the above discussion, many of the functions relating to the signaling and accounting for prepaid message services through the wireless network and the message communication based on the prepaid transaction results are implemented on computers or other programmable devices connected for communication via one or more networks. The relevant functions may be performed in hardware platforms providing SMSC, MMSC and/or prepaid server functionality.

The software implemented functionalities involve programming, including executable code as well as associated stored data, for causing the message center and/or server hardware to implement the relevant signaling communications across the prepaid interface, as exemplified by the various call flows. In operation, the code and possibly the associated data records are stored within the respective hardware platform. At other times, however, the software may be stored at other locations and/or transported for loading into the appropriate platform. Hence, the embodiments involve one or more software products in the form of one or more modules of code carried by at least one machine-readable medium. Execution of such code by a processor or the like enables the programmed device to implement the message center functions or the prepaid server functions, in the manner performed in the embodiments discussed and illustrated herein.

The present concepts also may be embodied in the request and response signaling messages, communicated across the prepaid signaling interface, between a prepaid server and a message center. Such a signaling message may be thought of as a product, when the signaling message contests are carried by or otherwise embodied in or on a machine readable medium.

As used herein, terms such as computer or machine "readable medium" refer to any medium that participates in providing instructions to a processor for execution or carries signaling message content to/from a platform or processor. Such a medium may take many forms, including but not limited to, non-volatile media, volatile media, and transmission media. Non-volatile media include, for example, optical or magnetic disks, such as any of the storage devices in any computer(s) operating as one of the message centers or as the prepaid servers in the examples. Volatile media include dynamic memory, such as main memory of a server or other computer platform. Physical transmission media include coaxial cables; copper wire and fiber optics, including the wires that comprise a bus within a computer system/server. Carrier-wave transmission media can take the form of electric or electromagnetic signals, or acoustic or light waves such as those generated during radio frequency (RF) and infrared (IR) data communications, for example, when carrying signaling messages or when carrying programming. Many of these forms of computer readable media may be involved in carrying one or more sequences of one or more instructions to a processor for storage and/or execution or carrying signaling message content data between a message center and a prepaid server.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

Authentication, Authorization, and Accounting (AAA)
Authentication Center (AUC)
Base Station Controller (BSC)
Base Transceiver System (BTS)
Central Processing Unit (CPU)
Code Division Multiple Access (CDMA)
Evolution, Data Only (EVDO)
Extensible Markup Language (XML)
Global Service for Mobile (GSM)
General Packet Radio Service (GPRS)

Home Location Register (HLR)
Internet Protocol (IP)
Internet Service Provider (ISP)
Lightweight Directory Access Protocol (LDAP)
Mobile Originated (MO)
Mobile Station (MS)
Mobile Switching Center (MSC)
Mobile Telephone Switching Office (MTSO)
Mobile Terminated (MT)
Multimedia Messaging Service (MMS)
Multimedia Messaging Service Center (MMSC)
Packet Data Serving Node (PDSN)
Personal Computer (PC)
Point-to-Point Protocol (PPP)
Portable Digital Assistant (PDA)
Public Switched Telephone Network (PSTN)
Radio Access Network (RAN)
Remote Authentication Dial-User Service (RADIUS)
Short Message Delivery Point to Point (SMDPP)
Short Message Service (SMS)
Short Message Service Center (SMSC)
Signaling System no. 7 (SS7)
Signal Transfer Point (STP)
Universal Mobile Telephone Service (UMTS)
Universal Resource Indicator (URI)
Visited Location Register (VLR)
Voice over IP (VoIP)
Wireless Local Area Network (WLAN)

What is claimed is:

1. A method of prepaid handling of a messaging service message for communication through a wireless network comprising steps of:
  receiving the messaging service message for communication through the wireless network, from a mobile station of a subscriber having prepaid wireless service, at a messaging service center in the wireless network;
  in response to receiving the messaging service message, sending, from the messaging service center to a prepaid server, a prepaid transaction request signaling message, wherein the prepaid transaction request signaling message includes a connected address list comprising an address for each of one or more communications devices to which the messaging service message is to be sent other than the mobile station of the subscriber;
  receiving, in response to the prepaid transaction request signaling message, a prepaid transaction response signaling message at the messaging service center from the prepaid server; and
  controlling processing of the messaging service message through the wireless network to the one or more communication devices based on data contained in the received signaling response message.

2. The method of claim 1, wherein the transaction request signaling message is a balance check request message requesting a check of the balance in a prepaid account of the subscriber, and the transaction response signaling message is a balance check response message.

3. The method of claim 1, wherein the transaction request signaling message is a debit account request message requesting debiting a prepaid account of the subscriber for delivery of the messaging service message, and the transaction response signaling message is a debit account response message.

4. The method of claim 1, further comprising detecting whether a policy override indicator is present in the prepaid transaction response signaling message, the presence of the policy override indicator requiring completion of communication of the messaging service message through the wireless network regardless of an applicable accounting policy.

5. The method of claim 1, further comprising detecting whether an exception indicator is present in the prepaid transaction response signaling message, the presence of the exception indicator requiring the prepaid server to deduct a premium from the prepaid account of the subscriber for international delivery of the messaging service message.

6. The method of claim 1, wherein:
  the messaging service message is intended for communication from the mobile station of the subscriber having the prepaid wireless service; and
  the connected address list contains an address of an intended destination device.

7. The method of claim 6, wherein if the address contained in the connected address list meets a predetermined condition, the executing of the prepaid accounting transaction will treat the message so as to enable free delivery through the wireless network.

8. A messaging service center, comprising:
  a communication interface configured to enable communication via a mobile network;
  a processor coupled with the communication interface;
  a storage device accessible to the processor; and
  an executable program in the storage device, wherein execution of the program by the processor configures the messaging service center to perform functions, including functions to:
    receive a messaging service message for communication through the wireless network, from a mobile station of a subscriber having prepaid wireless service, at the messaging service center in the wireless network;
    send, from the messaging service center to a prepaid server, a prepaid transaction request signaling message, wherein the prepaid transaction request signaling message includes a connected address list comprising an address for each of one or more communications devices to which the messaging service message is to be sent, other than the mobile station of the subscriber;
    receive a prepaid transaction response signaling message at the messaging service center from the prepaid server; and
    control further processing of the messaging service message through the wireless network to the one or more communication devices based on data contained in the received signaling response message.

9. The messaging service center of claim 8, wherein the transaction request signaling message is a balance check request message requesting a check of the balance in a prepaid account of the subscriber, and the transaction response signaling message is a balance check response message.

10. The messaging service center of claim 8, wherein the transaction request signaling message is a debit account request message requesting debiting a prepaid account of the subscriber for delivery of the messaging service message, and the transaction response signaling message is a debit account response message.

11. The messaging service center of claim 8, wherein execution of the program by the processor configures the messaging service center to perform functions, including functions to:
  detect in the prepaid transaction response signaling message a policy override indicator, for indicating whether to complete communication of the messaging service message through the wireless network regardless of an applicable accounting policy.

12. The messaging service center of claim 8, wherein execution of the program by the processor configures the messaging service center to perform functions, including functions to:
   detect whether an exception indicator is present in the prepaid transaction response signaling message, the presence of the exception indicator requiring the prepaid server to deduct a premium from the prepaid account of the subscriber for international delivery of the messaging service message.

13. The messaging service center of claim 8, wherein execution of the program by the processor configures the messaging service center to perform functions, including functions to: execute a prepaid accounting transaction with regard to an account of the subscriber, in response to the received prepaid transaction request signaling message.

14. The messaging service center of claim 13, wherein if the address contained in the connected address list meets a predetermined condition, the executing of the prepaid accounting transaction will treat the message so as to enable free delivery through the wireless network.

15. A method of prepaid accounting for handling of a messaging service message for communication through a wireless network comprising steps of:
   receiving a prepaid transaction request signaling message, at a prepaid server from a messaging service center of the wireless network, regarding a requested communication of the messaging service message through the wireless network from a mobile station of a subscriber having prepaid wireless service,
   the prepaid transaction request signaling message including a connected address list comprising an address for each of one or more communications devices to which the messaging service message is to be sent, other than the mobile station of the subscriber;
   executing a prepaid accounting transaction with regard to an account of the subscriber, in response to the received prepaid transaction request signaling message; and
   sending a prepaid transaction response signaling message from the prepaid server to the messaging service center, the prepaid transaction response signaling message reporting a result of the executed prepaid accounting transaction with regard to the account of the subscriber, the result enabling control of processing of the messaging service message through the wireless network.

16. The method of claim 15, wherein the transaction request signaling message is a balance check request message requesting a check of the balance in a prepaid account of the subscriber, and the transaction response signaling message is a balance check response message.

17. The method of claim 15, wherein the transaction request signaling message is a debit account request message requesting debiting a prepaid account of the subscriber for delivery of the user message, and the transaction response signaling message is a debit account response message.

18. The method of claim 15, wherein:
   if the address contained in the connected address list meets a predetermined condition, the executing of the prepaid accounting transaction will treat the message so as to enable free delivery through the wireless network.

19. The method of claim 15, further comprising including a policy override indicator, in the prepaid transaction response signaling message, for indicating whether to complete communication of the messaging service message through the wireless network regardless of an applicable accounting policy.

* * * * *